United States Patent
Masuda et al.

(10) Patent No.: US 12,412,702 B2
(45) Date of Patent: Sep. 9, 2025

(54) ELECTRONIC DEVICE HAVING CERAMIC ELEMENT AND METAL TERMINALS

(71) Applicant: TDK CORPORATION, Tokyo (JP)

(72) Inventors: Akihiro Masuda, Tokyo (JP); Takaaki Sato, Tokyo (JP); Shinya Ito, Tokyo (JP); Norihisa Ando, Tokyo (JP); Hideki Kaneko, Tokyo (JP); Ken Aburakawa, Tokyo (JP); Kenya Tamaki, Tokyo (JP); Akitoshi Yoshii, Tokyo (JP)

(73) Assignee: TDK CORPORATION, Tokyo (JP)

( * ) Notice: Subject to any disclaimer, the term of this patent is extended or adjusted under 35 U.S.C. 154(b) by 228 days.

(21) Appl. No.: 18/331,652

(22) Filed: Jun. 8, 2023

(65) Prior Publication Data
US 2023/0402228 A1    Dec. 14, 2023

(30) Foreign Application Priority Data
Jun. 14, 2022 (JP) ................................. 2022-095775

(51) Int. Cl.
*H01G 4/228* (2006.01)
*H01G 4/224* (2006.01)

(52) U.S. Cl.
CPC ............. *H01G 4/228* (2013.01); *H01G 4/224* (2013.01)

(58) Field of Classification Search
None
See application file for complete search history.

(56) References Cited

U.S. PATENT DOCUMENTS

| 3,503,721 | A | * | 3/1970 | Lupfer | H01G 4/228 257/772 |
| 3,989,987 | A | * | 11/1976 | Vorst | H01G 4/228 361/321.1 |
| 5,420,745 | A | * | 5/1995 | Hidaka | H01G 4/228 361/301.3 |
| 5,882,234 | A | * | 3/1999 | Kida | H01G 4/228 439/620.09 |

FOREIGN PATENT DOCUMENTS

| JP | 05101976 A | * | 4/1993 | |
| JP | 05109581 A | * | 4/1993 | ............... H01G 4/12 |
| JP | H06-196348 A | | 7/1994 | |

* cited by examiner

*Primary Examiner* — Eric W Thomas
(74) *Attorney, Agent, or Firm* — Oliff PLC

(57) ABSTRACT

An electronic device includes: a ceramic element including a first electrode portion and a second electrode portion; a first metal terminal including a first external connection portion and a first electrode connection portion connected to the first electrode portion through solder; and a second metal terminal including a second external connection portion and a second electrode connection portion connected to the second electrode portion through solder. The first electrode connection portion includes a first solder stopper formed by undulation of at least a part of a facing surface of the first electrode connection portion facing the first electrode portion to control a range of an adhesion region of solder to the first electrode portion. The second electrode connection portion includes a second solder stopper that is formed by undulation of at least a part of a facing surface of the second electrode connection portion facing the second electrode portion.

14 Claims, 21 Drawing Sheets

ELECTRONIC DEVICE HAVING CERAMIC ELEMENT AND METAL TERMINALS

BACKGROUND OF THE INVENTION

Field of the Invention

The present disclosure relates to an electronic device used as a capacitor and the like.

Description of the Related Art

Conventionally, an electronic device such as a capacitor formed by connecting metal terminals to a single-plate dielectric disk as disclosed in JP H6-196348 A has been proposed.

However, in the conventional electronic device, especially when a high voltage is applied, connection failures may occur between the dielectric disk and the metal terminals.

CITATION LIST

Patent Document 1: JP H6-196348 A

BRIEF SUMMARY OF THE INVENTION

The present disclosure has been made in view of such circumstances, and it is an object of the present disclosure to provide an electronic device with improved pressure resistance.

In order to achieve the aforementioned object, an electronic device according to the present disclosure includes: a ceramic element including a first electrode portion and a second electrode portion; a first metal terminal including a first electrode connection portion and a first external connection portion, the first electrode connection portion being connected to the first electrode portion through solder; and a second metal terminal including a second electrode connection portion and a second external connection portion, the second electrode connection portion being connected to the second electrode portion through solder. The first electrode connection portion includes a first solder stopper formed by undulation of at least a part of a facing surface of the first electrode connection portion facing the first electrode portion to control a range of an adhesion region of solder to the first electrode portion, and the second electrode connection portion includes a second solder stopper formed by undulation of at least a part of a facing surface of the second electrode connection portion facing the second electrode portion to control a range of an adhesion region of solder to the second electrode portion.

The present inventors have found that as the amount of solder for connecting the electrode connection portion of the metal terminal and the electrode portion of the ceramic element to each other increases, the pressure resistance decreases. The pressure resistance of the electronic device can be improved by controlling the adhesion region of the solder for connecting the electrode connection portion and the electrode portion to be within a predetermined range by using the solder stopper of the electrode connection portion.

At least one of the first solder stopper and the second solder stopper includes an electrode proximity portion on the facing surface and a solder storage portion for storing solder. In addition, the solder storage portion includes a recessed portion extending in a direction away from the ceramic element. Furthermore, an edge of the recessed portion is closed by the electrode proximity portion. By storing the solder in the recessed portion with the closed edge, the solder adhesion region can be controlled. As a result, the pressure resistance of the electronic device can be improved.

At least one of the first solder stopper and the second solder stopper includes a solder outflow prevention portion for controlling spread of solder, which is formed adjacent to an electrode proximity portion on the facing surface. In addition, the solder outflow prevention portion includes a recessed portion extending in a direction away from the ceramic element. Furthermore, a part of an edge of the recessed portion has an opening portion that is not closed by the electrode proximity portion. Since solder stays in the recessed portion with the open edge, the outflow of the solder can be effectively prevented. Therefore, the solder adhesion region can be controlled.

The first electrode connection portion has an approximately rectangular shape extending along a first main surface of the ceramic element. The second electrode connection portion has an approximately rectangular shape extending along a second main surface of the ceramic element. At least one of the first electrode connection portion and the second electrode connection portion has the solder outflow prevention portion arranged so as to extend in a direction crossing a longitudinal direction of the first electrode connection portion or the second electrode connection portion. In addition, the adhesion region and a non-adhesion region of the first electrode portion or the second electrode portion to which solder does not adhere are separated from each other with the solder outflow prevention portion as a boundary.

By adopting such a configuration, the solder adhesion region can be controlled to be located on one side in the longitudinal direction of the electrode connection portion. As a result, the pressure resistance of the electronic device can be improved.

At least one of the first solder stopper and the second solder stopper includes a protruding portion that protrudes in a direction approaching the ceramic element. The outflow of the solder can also be prevented by forming a protruding portion in the electrode connection portion.

A case in which the ceramic element is housed in a housing recess may be provided. Since the ceramic element is housed in the housing recess of the case, there is no need for a step of arranging the ceramic element and the like in a cavity for resin molding and performing molding with an exterior material. As a result, good productivity is obtained.

The first external connection portion and the second external connection portion are arranged in an opening edge portion of the housing recess. By adopting such a configuration, when the electronic device is mounted on a substrate or the like, a connection to an external circuit formed on the substrate can be easily made with the opening edge portion as a mounting surface.

In addition, the first external connection portion and the second external connection portion are arranged approximately parallel to a first main surface and a second main surface of the ceramic element. In addition, the first external connection portion and the second external connection portion are arranged approximately perpendicular to a first main surface and a second main surface of the ceramic element.

the housing recess is filled with mold resin. By adopting such a configuration, the mold resin can cover the entire ceramic element. As a result, the strength, insulation, and the like of the electronic device can be improved.

DETAILED DESCRIPTION OF THE INVENTIONS

Hereinafter, the present disclosure will be described based on embodiments shown in the diagrams. For those who provide explanations with reference to diagrams as necessary, the illustrated contents are only schematically and exemplarily shown for understanding of the present application, and the appearance, dimensional ratio, and the like may be different from the actual ones. In addition, the present disclosure will be specifically described below based on embodiments, but the present disclosure is not limited to these embodiments.

First Embodiment

Figure 1:
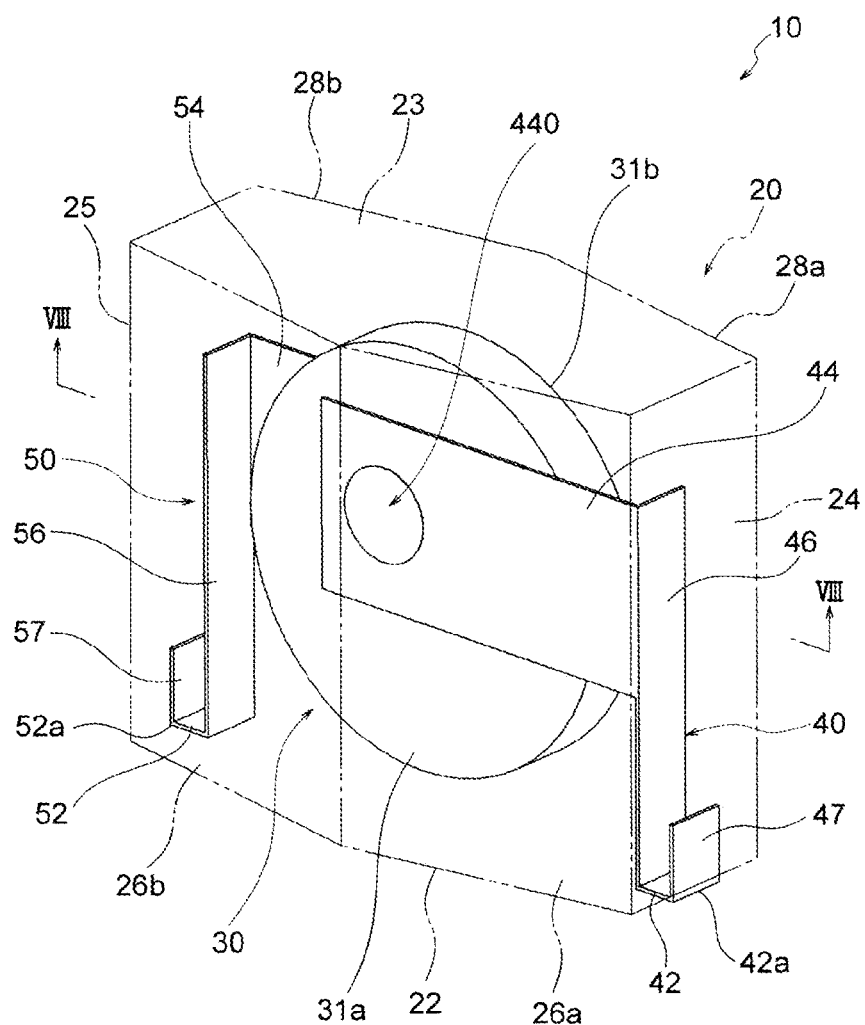
FIG. 1 is a schematic perspective view showing the configuration of an electronic device according to a first embodiment.
Figure 2:
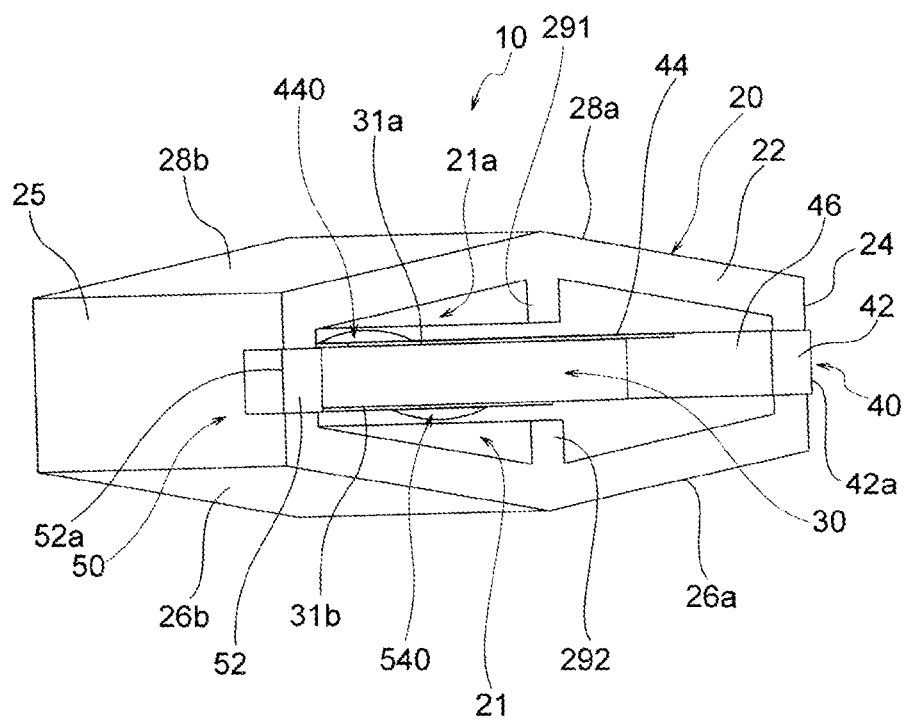
FIG. 2 is a schematic perspective view of the electronic device shown in FIG. 1 when viewed from another angle.

FIG. 1 is a schematic perspective view of an electronic device 10 according to the present embodiment. As shown in FIG. 1, the electronic device 10 includes a ceramic element 30 and a case 20 in which the ceramic element 30 is housed. As shown in FIG. 2, the case 20 includes a housing recess 21, and the ceramic element 30 is housed in the housing recess 21.

Figure 4:
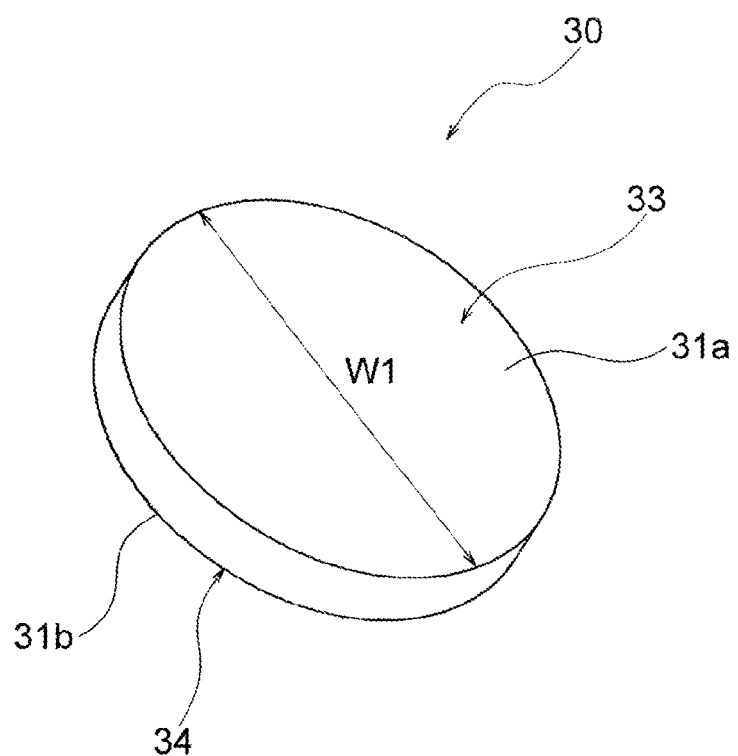
FIG. 4 is a schematic perspective view showing the configuration of a ceramic element of the electronic device shown in FIG. 1.
Figure 8:
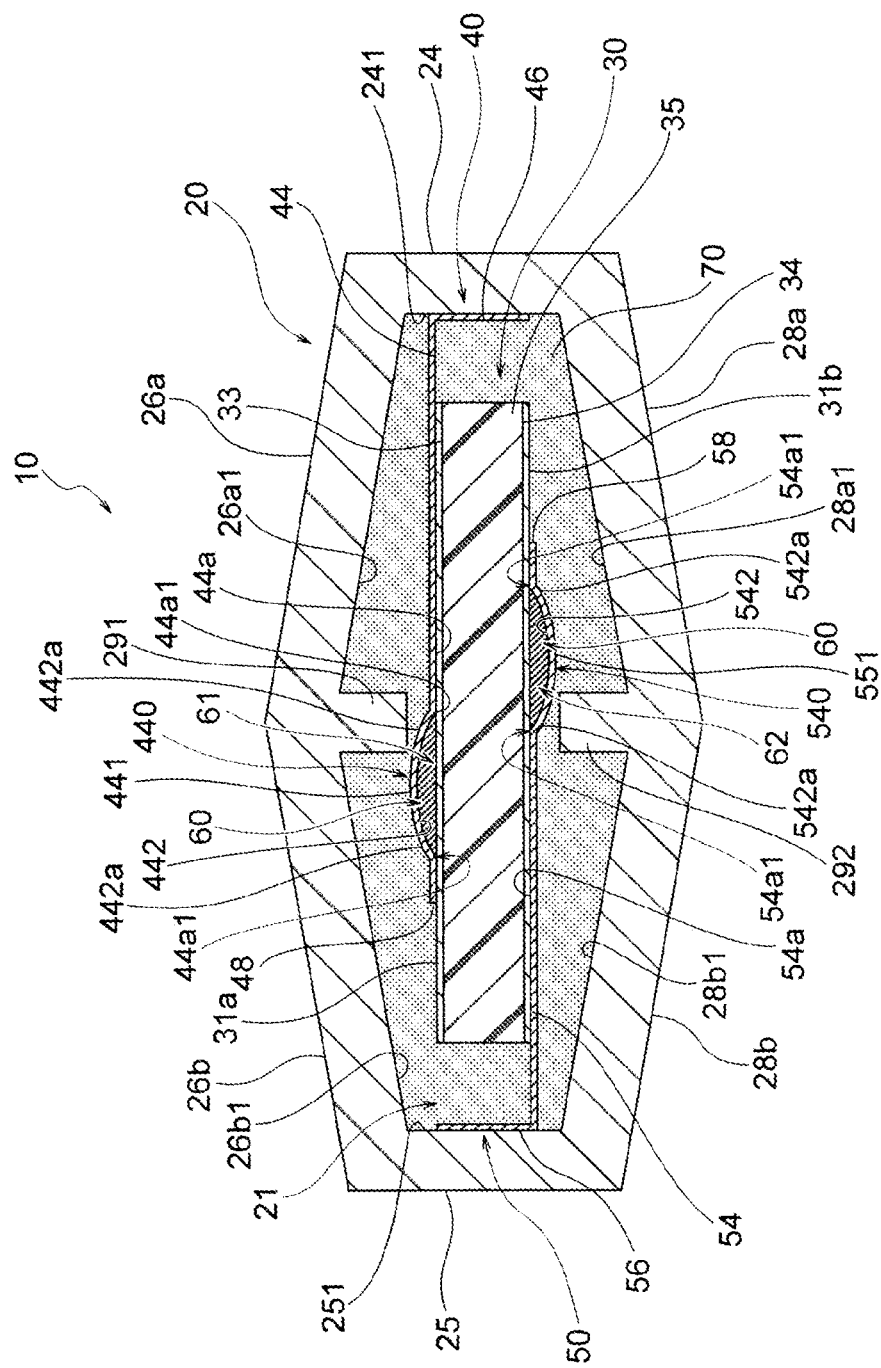
FIG. 8 is a cross-sectional view taken along the line VIII-VIII shown in FIG. 1.

As shown in FIG. 4, the ceramic element 30 has the first main surface 31a and the second main surface 31b facing each other, and has an approximately disk-like outer shape. However, the ceramic element 30 may have a shape other than the disk shape, such as an elliptical disk shape or a rectangular flat plate shape. The first main surface 31a and the second main surface 31b are a pair of surfaces having the largest area in the ceramic element 30. In addition, as shown in FIG. 8, in the description of the ceramic element 30, one of the two main surfaces is referred to as the first main surface 31a, and the other main surface is referred to as the second main surface 31b. However, the first main surface 31a and the second main surface 31b may be interchanged with respect to the state shown in the diagram.

As shown in FIG. 8, which is a cross-sectional view of the electronic device 10, the ceramic element 30 includes a first electrode portion 33 formed on the first main surface 31a, a second electrode portion 34 formed on the second main surface 31b, and a dielectric portion 35 interposed between the first electrode portion 33 and the second electrode portion 34. The material of the dielectric portion 35 is not particularly limited. For example, the dielectric portion 35 is formed of a dielectric material such as calcium titanate, strontium titanate, barium titanate, or a mixture thereof. In addition, the ceramic element 30 is not limited to a capacitor or the like in which the dielectric portion 35 is interposed between the first electrode portion 33 and the second electrode portion 34. For example, the ceramic element may be a varistor or a thermistor in which a semiconductor ceramic is interposed between a first electrode portion and a second electrode portion.

The materials of the first electrode portion 33 and the second electrode portion 34 are not particularly limited, and copper, a copper alloy, nickel, a nickel alloy, and the like are usually used. However, silver, an alloy of silver and palladium, and the like can also be used. The thicknesses of the first electrode portion 33 and the second electrode portion 34 are usually about 10 to 50 μm although the thicknesses are not particularly limited. In addition, a metal coating film containing at least one selected from Ni, Cu, Sn, and the like may be formed on the surfaces of the first electrode portion 33 and the second electrode portion 34.

As shown in FIGS. 1 and 2, the case 20 defines the outer shape of the electronic device 10, and the outer shape of the electronic device 10 is an approximately hexagonal prism shape. All outer side surfaces 24, 25, 26a, 26b, 28a, and 28b of the case 20 are not parallel to the first main surface 31a and the second main surface 31b of the ceramic element 30. However, the electronic device 10 is not limited thereto, and may have a polygonal prism shape other than the hexagonal prism shape, or may have a flat plate shape such as a rectangular parallelepiped.

Figure 3:
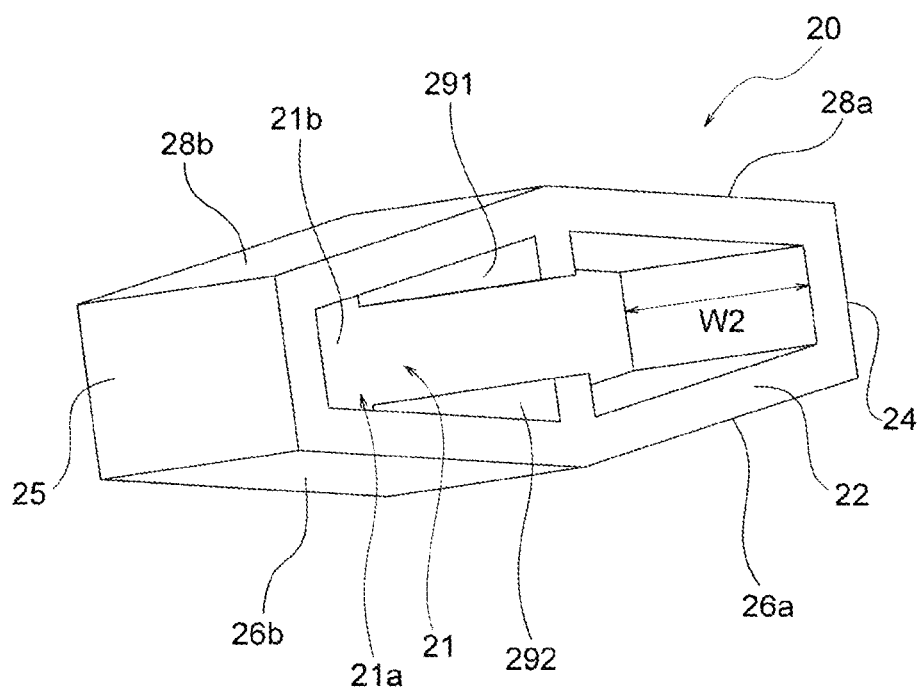
FIG. 3 is a schematic perspective view showing the configuration of a case of the electronic device shown in FIG. 1.

As shown in FIG. 3, the case 20 has six outer side surfaces perpendicular to an opening edge portion 22 surrounding an opening 21*a* of the housing recess 21. The six outer side surfaces of the case 20 are a first outer side surface 24, a second outer side surface 25, a third outer side surface 26*b*, a fourth outer side surface 28*a*, a fifth outer side surface 26*a*, and a sixth outer side surface 28*b*.

As shown in FIG. 8, the first outer side surface 24 and the second outer side surface 25 are a pair of outer side surfaces facing each other. As shown in FIG. 8, the fifth outer side surface 26*a* is connected to the first outer side surface 24 while forming an included angle greater than 90 degrees, and the third outer side surface 26*b* is connected to the second outer side surface 25 while forming an included angle greater than 90 degrees. The fifth outer side surface 26*a* and the third outer side surface 26*b* have approximately the same area, and are connected to each other while forming an included angle greater than 90 degrees at the central portion of the electronic device 10.

As shown in FIG. 8, the fourth outer side surface 28*a* and the sixth outer side surface 28*b* are symmetrical with respect to the fifth outer side surface 26*a* and the third outer side surface 26*b*, respectively. That is, the fourth outer side surface 28*a* is connected to the first outer side surface 24 while forming an included angle greater than 90 degrees, and the sixth outer side surface 28*b* is connected to the second outer side surface 25 while forming an included angle greater than 90 degrees. The fourth outer side surface 28*a* and the sixth outer side surface 28*b* have approximately the same area, and are connected to each other while forming an included angle greater than 90 degrees at the central portion of the electronic device 10.

As shown in FIG. 8, the first and second outer side surfaces 24 and 25 are approximately perpendicular to the first main surface 31*a* and the second main surface 31*b*, whereas the fourth to sixth outer side surfaces are arranged obliquely with respect to the first main surface 31*a* and the second main surface 31*b*.

As shown in FIGS. 2 and 3, the case 20 includes the housing recess 21 and the opening edge portion 22 surrounding the opening 21*a* of the housing recess 21. In the electronic device 10, the side where the opening 21*a* of the housing recess 21 formed in the case 20 is formed is a mounting surface side facing a substrate that is a mounting target when mounting the electronic device 10.

FIG. 2 is a bottom view of the electronic device 10 when viewed from the mounting surface side. In the case 20, the ceramic element 30 and the like are housed inside the housing recess 21. The opening 21*a* of the housing recess 21 has a shape smaller than the outer shape of the case 20. In addition, as shown in FIG. 1, a top surface 23 of the case 20 is formed above the electronic device 10 in a direction opposite to the opening 21*a* of the housing recess 21.

As shown in FIG. 8, the housing recess 21 has six inner side surfaces along the outer shape of the case 20. A first inner side surface 241 is parallel to the first outer side surface 24, a second inner side surface 251 is parallel to the second outer side surface 25, a third inner side surface 26*b*1 is parallel to the third outer side surface 26*b*, a fourth inner side surface 28*a*1 is parallel to the fourth outer side surface 28*a*, a fifth inner side surface 26*a*1 is parallel to the fifth outer side surface 26*a*1, and a sixth inner side surface 28*b*1 is parallel to the sixth outer side surface 28*b*.

As shown in FIG. 8, a support portion 291 that protrudes vertically toward the first main surface 31*a*1 of the ceramic element 30 and a support portion 292 that protrudes vertically toward the second main surface 31*b* are formed in the housing recess 21. The support portion 291 is arranged between the third inner side surface 26*b*1 and the fifth inner side surface 26*a*1, and the support portion 292 is arranged between the fourth inner side surface 28*a*1 and the sixth inner side surface 28*b*1. As shown in FIG. 3, the support portions 291 and 292 extend from the opening edge portion 22 to a bottom surface 21*b* of the case 20. In addition, although the support portions 291 and 292 may not be provided, the support portions 291 and 292 can stabilize the ceramic element housed in the housing recess 21.

As shown in FIGS. 2 and 3, the opening edge portion 22 is configured by a plane surrounding the opening 21*a*. The opening edge portion 22 is approximately perpendicular to the first main surface 31*a* and the second main surface 31*b* of the ceramic element 30. In the present embodiment, the opening edge portion 22 is even with the ends of the support portions 291 and 292. In addition, the shape of the opening edge portion 22 may change depending on the shape of the opening 21*a*, the outer peripheral shape of the case 20, and the like.

As shown in FIG. 2, the ceramic element 30 is arranged in the housing recess 21 so that the first main surface 31*a* and the second main surface 31*b* face a direction perpendicular to the opening 21*a*. Therefore, as shown in FIG. 3, a depth W2, which is the distance from the opening edge portion 22 to the bottom surface 21*b* of the case 20, is larger than a diameter W1 of the ceramic element 30 shown in FIG. 4. Therefore, in the electronic device 10, the entire ceramic element 30 can be housed in the housing recess 21 without a part of the ceramic element 30 being exposed from the opening 21*a* of the housing recess 21. In addition, in the present embodiment, as shown in FIG. 8, in the electronic device 10, the housing recess 21 is filled with mold resin 70, and the entire ceramic element 30 can be covered with the mold resin 70.

Figure 5:
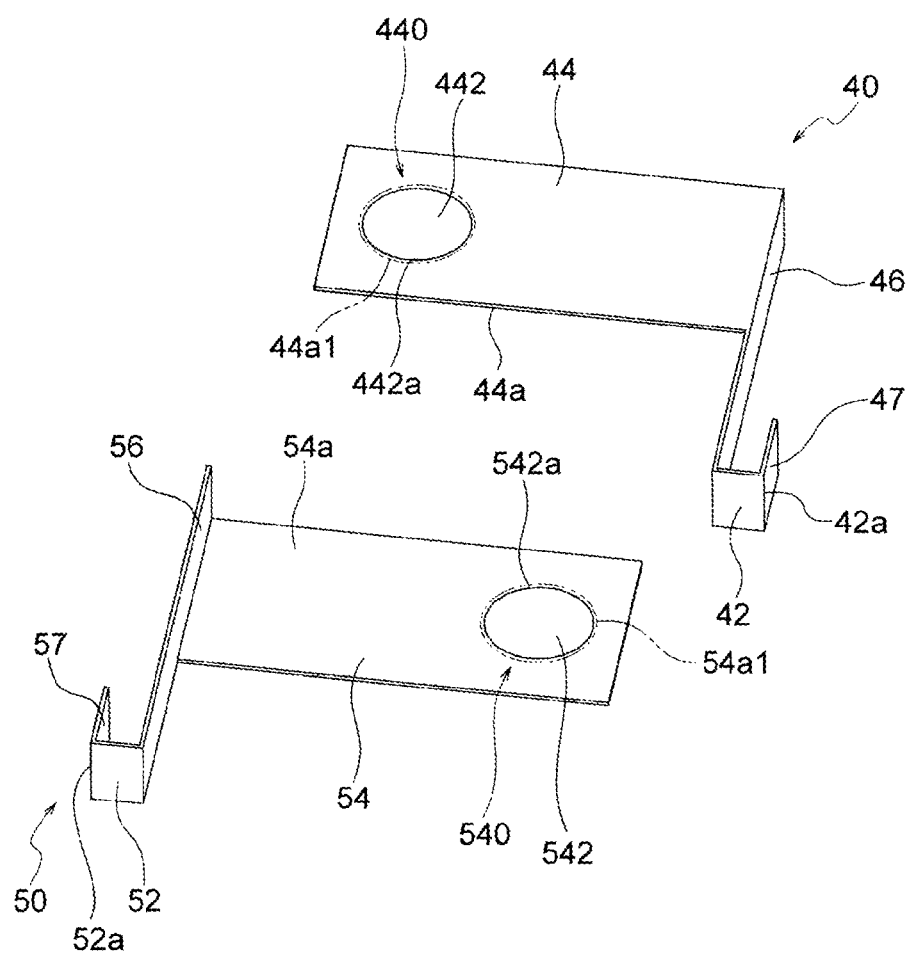
FIG. 5 is a schematic perspective view showing the configuration of a metal terminal of the electronic device shown in FIG. 1.

FIG. 5 is a schematic perspective view showing a first metal terminal 40 and a second metal terminal 50 in the present embodiment. As shown in FIG. 1, the electronic device 10 includes a pair of first and second metal terminals 40 and 50. The first metal terminal 40 and the second metal terminal 50 are arranged so as to be spaced apart from each other in the electronic device 10, thereby being electrically insulated from each other. The first metal terminal 40 and the second metal terminal 50 are formed, for example, by machining a conductive metal plate material. However, the method of forming the first and second metal terminals 40 and 50 is not particularly limited.

Figure 6:
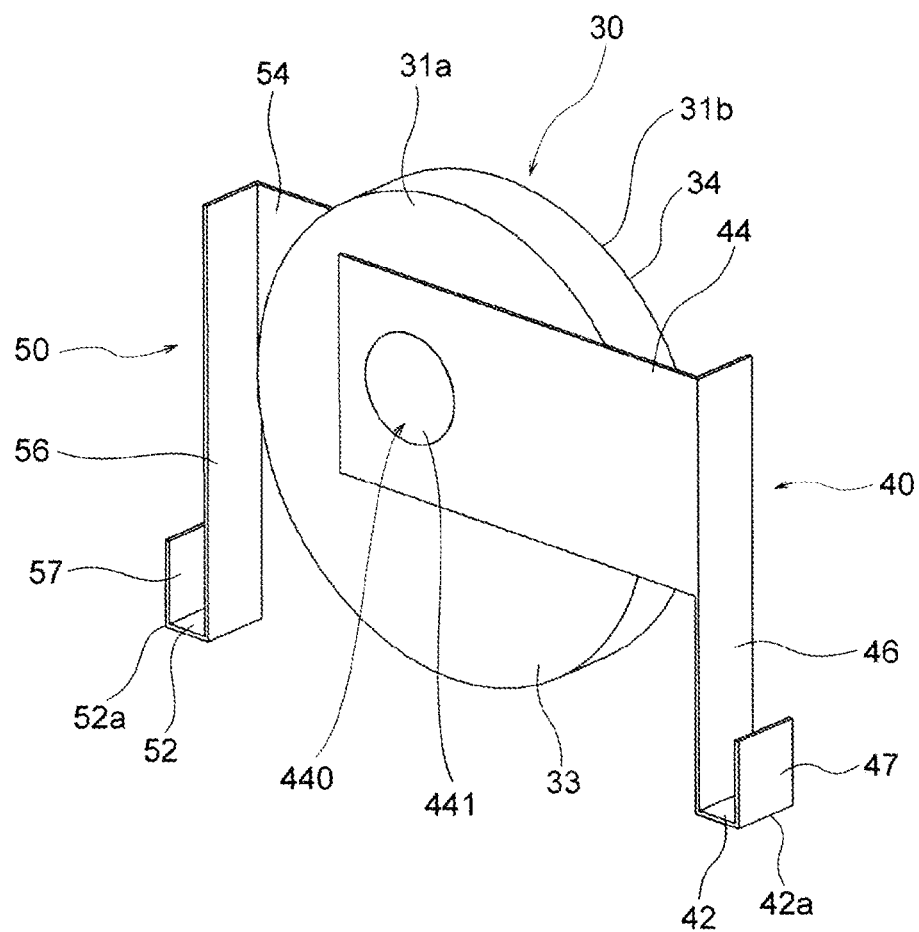
FIG. 6 is a schematic perspective view showing a partially assembled state of the electronic device shown in FIG. 1.
Figure 7:
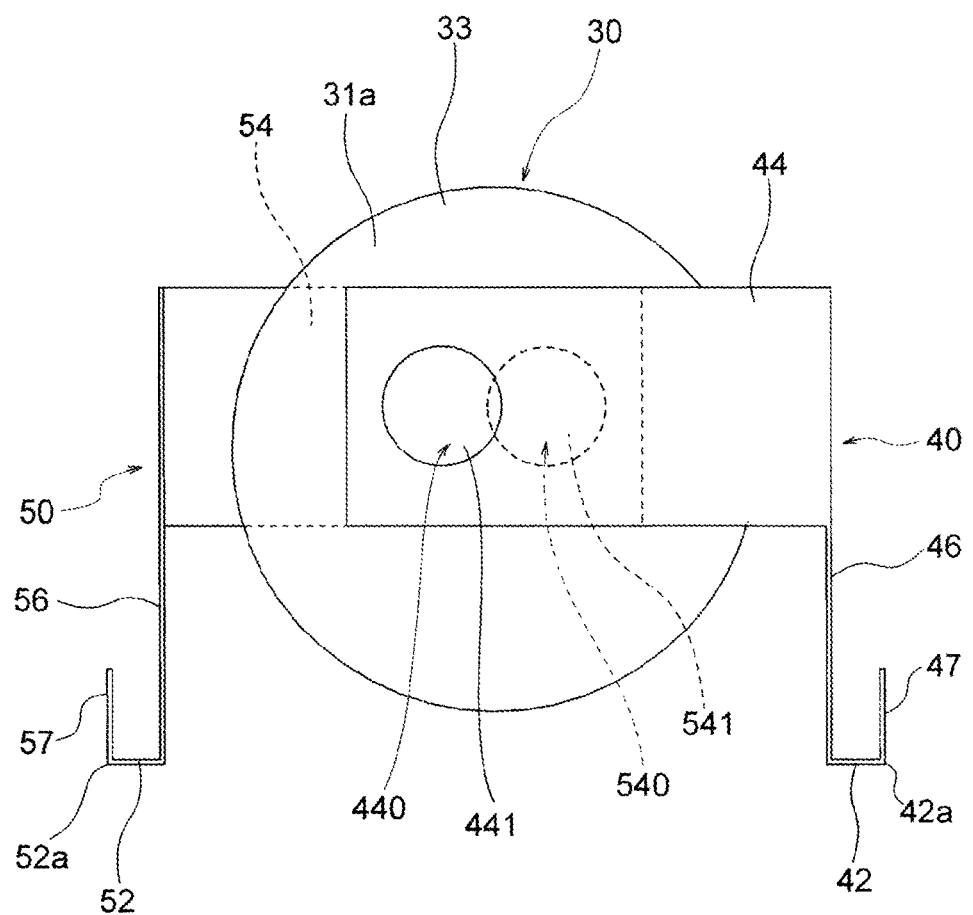
FIG. 7 is a plan view of a part of the electronic device shown in FIG. 6.

As shown in FIGS. 6 and 7, the first metal terminal 40 includes a first electrode connection portion 44 connected to the first electrode portion 33 of the ceramic element 30 through solder, a first external connection portion 42 arranged in the opening edge portion 22 shown in FIGS. 1 and 2, a first terminal arm portion 46 that connects the first external connection portion 42 and the first electrode connection portion 44 to each other, and a first folded portion 47 extending upward from a distal end 42*a* of the first external connection portion 42. As shown in FIG. 2, the first electrode connection portion 44 and the first terminal arm portion 46 are housed in the housing recess 21 of the case 20 similarly to the ceramic element 30.

As shown in FIG. 7, the first electrode connection portion 44 has an approximately rectangular shape extending approximately parallel along the first main surface 31*a* of the ceramic element 30. As shown in FIG. 8, a facing surface 44*a* of the first electrode connection portion 44 is connected to the first electrode portion 33 formed on the first main surface 31*a* through solder 60. On the other hand, the first external connection portion 42 is arranged on one side of the opening edge portion 22 (on the first outer side surface 24 side of the case 20).

As shown in FIG. 1, the first terminal arm portion 46 of the first metal terminal 40 connects the first electrode connection portion 44 inside the housing recess of the case 20 to the first external connection portion 42 outside the housing recess of the case 20. In addition, as shown in FIG. 1, the first external connection portion 42 is approximately perpendicular to the first main surface 31a and the second main surface 31b of the ceramic element 30.

As shown in FIG. 1, the distal end 42a of the first external connection portion 42 is an end on a side opposite to a side of the first external connection portion 42 connected to the first terminal arm portion 46, and is connected to the first folded portion 47.

As shown in FIG. 1, the first folded portion 47 of the first metal terminal 40 extends upward along the first outer side surface 24 of the case 20 from the distal end 42a of the first external connection portion 42. Since the first metal terminal 40 includes the first folded portion 47, a solder fillet is easily formed during mounting. Therefore, the electronic device 10 including such a first folded portion 47 has good mountability. In addition, as shown in FIG. 1, since the first terminal arm portion 46, the first external connection portion 42, and the first folded portion 47 are provided, the distal end of the first metal terminal 40 has a J shape. For this reason, in the electronic device 10, a part of the case 20 is interposed between the first terminal arm portion 46 and the first folded portion 47. Therefore, the first metal terminal 40 can be more strongly engaged with the case 20.

As shown in FIG. 8, the first electrode connection portion 44 includes a first solder stopper 440. The first solder stopper 440 is formed by the undulation of a part of the facing surface 44a of the first electrode connection portion 44 facing the first electrode portion 33. In the first solder stopper 440, the range of an adhesion region 61 of the solder 60 to the first electrode portion 33 is controlled.

As shown in FIG. 5, in the present embodiment, the first solder stopper 440 includes an electrode proximity portion 44a1 on the facing surface 44a. As shown in FIG. 8, the first solder stopper 440 includes a solder storage portion 441 for storing the solder 60. The electrode proximity portion 44a1 is a portion of the facing surface 44a closest to the first main surface 31a of the first electrode portion 33. In the present embodiment, the electrode proximity portion 44a1 includes an edge 442a of a recessed portion 442, and corresponds to a glue margin for bonding the first metal terminal 40 and the ceramic element 30 to each other with the solder 60 stored in the solder storage portion 441. In addition, the electrode proximity portion 44a1 may be in contact with the first electrode portion 33. The solder storage portion 441 includes the recessed portion 442 extending in a direction away from the ceramic element 30 due to the undulation of the facing surface 44a in the electrode proximity portion 44a1. That is, the recessed portion 442 is recessed with respect to the ceramic element 30.

The edge 442a of the recessed portion 442 shown in FIG. 8 is closed by the electrode proximity portion 44a1 as shown in FIG. 5. The solder 60 adheres to the electrode proximity portion 44a1, so that the first metal terminal 40 and the first electrode portion 33 are electrically connected to each other. By storing the solder 60 inside the recessed portion 442 with the edge 442a closed, the solder adhesion region 61 can be controlled.

As shown in FIG. 5, the second metal terminal 50 has the same shape and size as the first metal terminal 40. As shown in FIG. 6, the second metal terminal 50 includes a second electrode connection portion 54 connected to the second electrode portion 34 of the ceramic element 30 through solder, a second external connection portion 52 arranged in the opening edge portion 22 shown in FIGS. 1 and 2, a second terminal arm portion 56 that connects the second external connection portion 52 and the second electrode connection portion 54 to each other, and a second folded portion 57 extending upward from a distal end 52a of the second external connection portion 52. As shown in FIG. 2, the second electrode connection portion 54 and the second terminal arm portion 56 are housed in the housing recess 21 of the case 20 similarly to the ceramic element 30.

As shown in FIG. 7, the second electrode connection portion 54 has an approximately rectangular shape extending approximately parallel along the second main surface 31b of the ceramic element 30. As shown in FIG. 8, a facing surface 54a of the second electrode connection portion 54 is connected to the second electrode portion 34 formed on the second main surface 31b through solder. On the other hand, the second external connection portion 52 is arranged on one side of the opening edge portion 22 (on the second outer side surface 25 side of the case 20).

As shown in FIG. 1, the second terminal arm portion 56 of the second metal terminal 50 connects the second electrode connection portion 54 inside the housing recess of the case 20 to the second external connection portion 52 outside the housing recess of the case 20. In addition, as shown in FIG. 1, the second external connection portion 52 is approximately perpendicular to the first main surface 31a and the second main surface 31b of the ceramic element 30.

As shown in FIG. 2, the distal end 52a of the second external connection portion 52 is an end on a side opposite to a side of the second external connection portion 52 connected to the second terminal arm portion 56, and is connected to the second folded portion 57.

As shown in FIG. 1, the second folded portion 57 of the second metal terminal 50 extends upward along the second outer side surface 25 of the case 20 from the distal end 52a of the second external connection portion 52. Since the second metal terminal 50 includes the second folded portion 57, a solder fillet is easily formed during mounting. Therefore, the electronic device 10 including such a second folded portion 57 has good mountability. In addition, as shown in FIG. 1, since the second terminal arm portion 56, the second external connection portion 52, and the second folded portion 57 are provided, the distal end of the second metal terminal 50 has a J shape. For this reason, in the electronic device 10, a part of the case 20 is interposed between the second terminal arm portion 56 and the second folded portion 57. Therefore, the second metal terminal 50 can be more strongly engaged with the case 20.

As shown in FIG. 8, the second electrode connection portion 54 includes a second solder stopper 540. The second solder stopper 540 is formed by the undulation of a part of the facing surface 54a of the second electrode connection portion 54 facing the second electrode portion 34. In the second solder stopper 540, the range of an adhesion region 62 of the solder 60 to the second electrode portion 34 is controlled.

As shown in FIG. 5, in the present embodiment, the second solder stopper 540 includes the electrode proximity portion 54a1 on the facing surface 54a. As shown in FIG. 8, the second solder stopper 540 includes a solder storage portion 541 for storing the solder 60. The electrode proximity portion 54a1 is a portion of the facing surface 54a closest to the second main surface 31b of the second electrode portion 34. In the present embodiment, the electrode proximity portion 54a1 includes an edge 542a of a recessed portion 542, and corresponds to a glue margin for bonding the second metal terminal 50 and the ceramic element 30 to each other with the solder 60 stored in the solder storage portion 541. In addition, the electrode proximity portion 54a1 may be in contact with the second electrode portion 34. The solder storage portion 541 includes the recessed portion 542 extending in a direction away from the ceramic element 30 due to the undulation of the facing surface 54a in the electrode proximity portion 54a1. That is, the recessed portion 542 is recessed with respect to the ceramic element 30.

The edge 542a of the recessed portion 542 shown in FIG. 8 is closed by the electrode proximity portion 54a1 as shown in FIG. 5. The solder 60 adheres to the electrode proximity portion 54a1, so that the second metal terminal 50 and the second electrode portion 34 are electrically connected to each other. By storing the solder 60 inside the recessed portion 542 with the edge 542a closed, the solder adhesion region 62 can be controlled.

Normally, a ceramic element in an electronic device repeats expansion and contraction due to piezoelectric action or the like especially when a high AC voltage is applied to the ceramic element, but metal terminals have little change in volume. In addition, solder that connects the ceramic element and the metal terminals constrains the expansion and contraction of the ceramic element. The present inventors have found that force is applied to the solder due to the constraint of the expansion and contraction of the ceramic element, causing cracks or the like.

As shown in FIG. 8, in the present embodiment, the edges 442a and 542a of the recessed portions 442 and 542 of the solder storage portions 441 and 541 are closed, and the solder 60 is stored therein. By controlling the areas of the solder adhesion regions 61 and 62 to be small in this manner, the ceramic element 30 is not excessively constrained by the first electrode connection portion 44 and the second electrode connection portion 54. Therefore, in the electronic device 10 according to the present embodiment, the pressure resistance is improved. For example, even at medium and high voltages of 8 kV to 20 kV, the electronic device 10 can be used satisfactorily without causing cracks or the like in the ceramic element 30. In addition, in this specification, solder is a term that represents not only an alloy containing lead and tin as main components but also a conductive adhesive and a material that enables electrical connection and fixing between members.

In addition, since the solder 60 is stored in the solder storage portions 441 and 541, deviations in the amount of solder applied, deviations in the areas of the solder adhesion regions 61 and 62, and deviation in the degree of adhesion between the ceramic element 30 and the first electrode connection portion 44 and the second electrode connection portion 54 can also be reduced. The areas of the solder adhesion regions 61 and 62 are not particularly limited as long as these can secure the electrical connection between the first electrode portion 33 and the first electrode connection portion 44 and the electrical connection between the second electrode portion 34 and the second electrode connection portion 54. For example, the areas of the solder adhesion regions 61 and 62 can be one fourth or less of the areas of the facing surfaces 44a and 54a. In addition, as shown in FIG. 5, in the present embodiment, the recessed portions 442 and 542 are circular with the edges 442a and 542a closed, but are not limited to this shape, and may be elliptical, polygonal, or the like.

The materials of the first metal terminal 40 and the second metal terminal 50 shown in FIG. 5 and the like are not particularly limited as long as these are metal materials having electrical conductivity. For example, iron, nickel, copper, silver, or alloys containing these can be used. In addition, a metal coating film containing Ni, Sn, Cu, or the like may be formed on the surfaces of the first metal terminal 40 and the second metal terminal 50.

As shown in FIG. 2, in the present embodiment, the first external connection portion 42 and the second external connection portion 52 are arranged in the opening edge portion 22 of the housing recess 21, but the present disclosure is not limited thereto. In this configuration, when the electronic device 10 is mounted on a substrate or the like, a connection to an external circuit formed on the substrate can be easily made with the opening edge portion 22 as a mounting surface.

As shown in FIG. 1, in the present embodiment, the electronic device 10 includes the case 20, but the present disclosure is not limited thereto. When there is the case 20 in which the ceramic element 30 is housed in the housing recess 21, there is no need for a step of arranging the ceramic element 30 and the like in a cavity for resin molding and performing molding with an exterior material because the ceramic element 30 is housed in the housing recess 21 of the case 20. Therefore, good productivity is obtained.

As shown in FIG. 8, in the present embodiment, the housing recess 21 is filled with a mold resin 70. In this configuration, since the mold resin 70 can cover the entire ceramic element 30, the strength, insulation, and the like of the electronic device 10 can be improved. However, the housing recess 21 may not be filled with resin, and a gap may be formed between the inner wall of the housing recess 21 and the ceramic element 30 and each of the first and second metal terminals 40 and 50.

The case 20 can be manufactured, for example, by injection molding using resin. However, the material of the case 20 is not limited to resin.

The electronic device 10 shown in FIG. 1 can be manufactured, for example, by the following steps. First, the ceramic element 30, the first metal terminal 40, and the second metal terminal 50 are prepared, molten solder is stored in the solder storage portions 441 and 541 of the first and second metal terminals 40 and 50, and the first metal terminal 40 and the second metal terminal 50 are connected to the first electrode portion 33 and the second electrode portion 34 of the ceramic element 30, respectively. Alternatively, in a state in which molten solder is placed at predetermined positions of the first electrode portion 33 and the second electrode portion 34, the connections may be made so that the molten solder is placed in the solder storage portions 442 and 542 of the first and second electrode connection portions 44 and 54.

Then, an intermediate product shown in FIG. 6 in which the first metal terminal 40, the second metal terminal 50, and the ceramic element 30 are integrated is arranged in the housing recess 21 of the case 20. Thereafter, if necessary, mold resin is injected into the housing recess 21 shown in FIG. 2 to obtain the electronic device 10 shown in FIG. 1. As described above, in the electronic device 10 shown in FIG. 2, the ceramic element 30 is housed in the housing recess 21 of the case 20. Therefore, since there is no need for a step of arranging the ceramic element 30 and the like in a cavity for resin molding and performing molding with an exterior material, good productivity is obtained.

In the electronic device 10, the ceramic element 30 and the like can be housed in the case 20. Therefore, the size of the ceramic element 30 can be flexibly changed as long as the ceramic element 30 can be housed in the case 20. In addition, since the first external connection portion 42 and the second external connection portion 52 are perpendicular to the first main surface 31a and the second main surface 31b of the ceramic element 30, the mounting area of the electronic device 10 can be reduced, which is suitable for surface mounting.

Second Embodiment

An electronic device according to the present embodiment is different from the electronic device 10 according to the first embodiment in terms of the first solder stopper 440 and the second solder stopper 540, but the basic configuration is the same as that in the first embodiment. In the present embodiment, the description of portions in common with the first embodiment will be omitted, and different portions will mainly be described in detail below. Portions not described in the present embodiment are the same as those described in the first embodiment.

Figure 9:
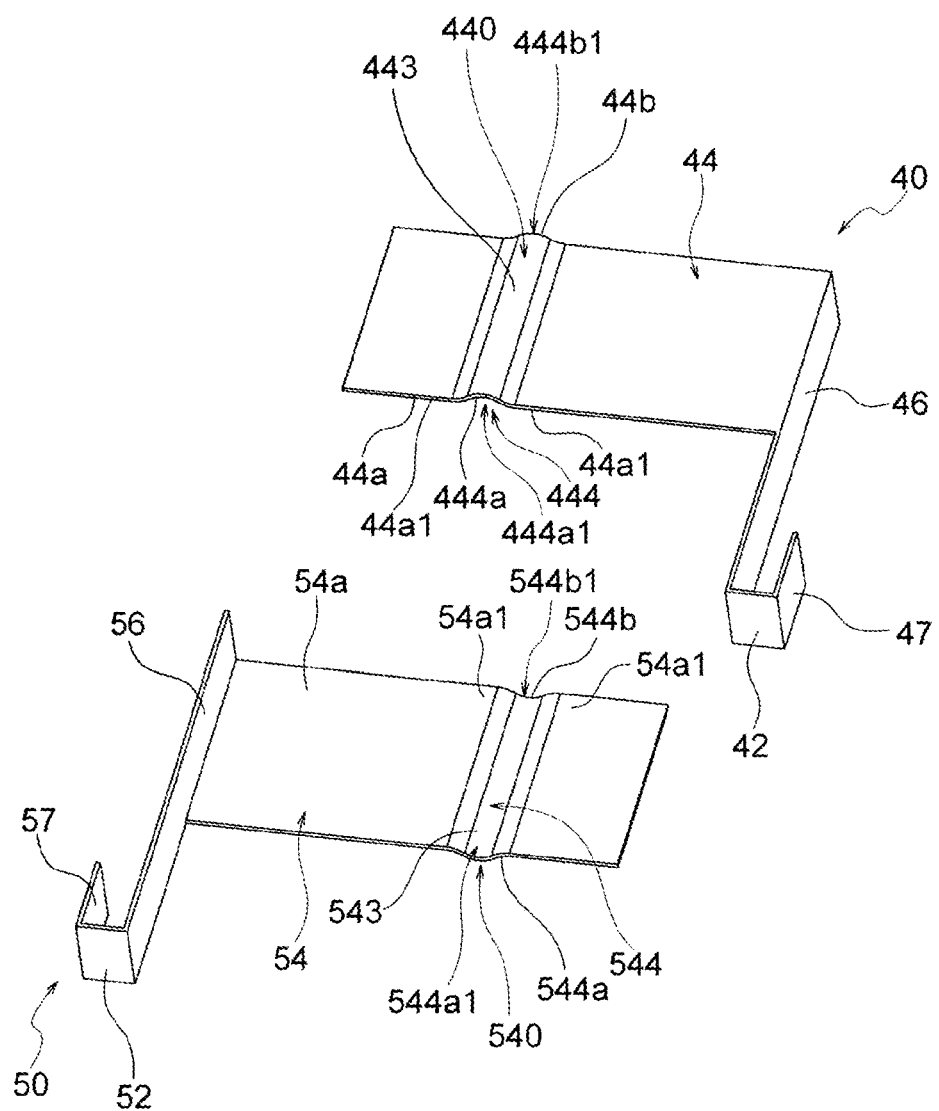
FIG. 9 is a schematic perspective view showing the configuration of a metal terminal of an electronic device according to a second embodiment.
Figure 10:
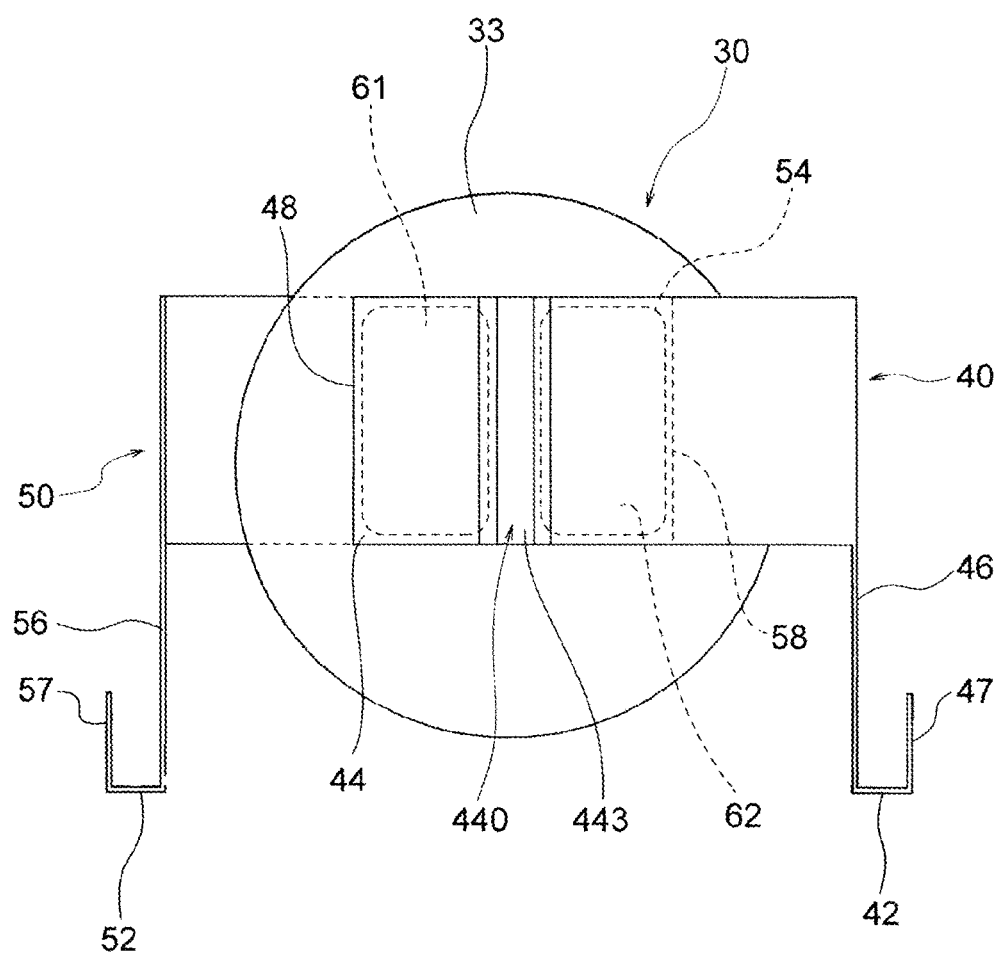
FIG. 10 is a plan view showing a partially assembled state of the electronic device according to the second embodiment.
Figure 11A:
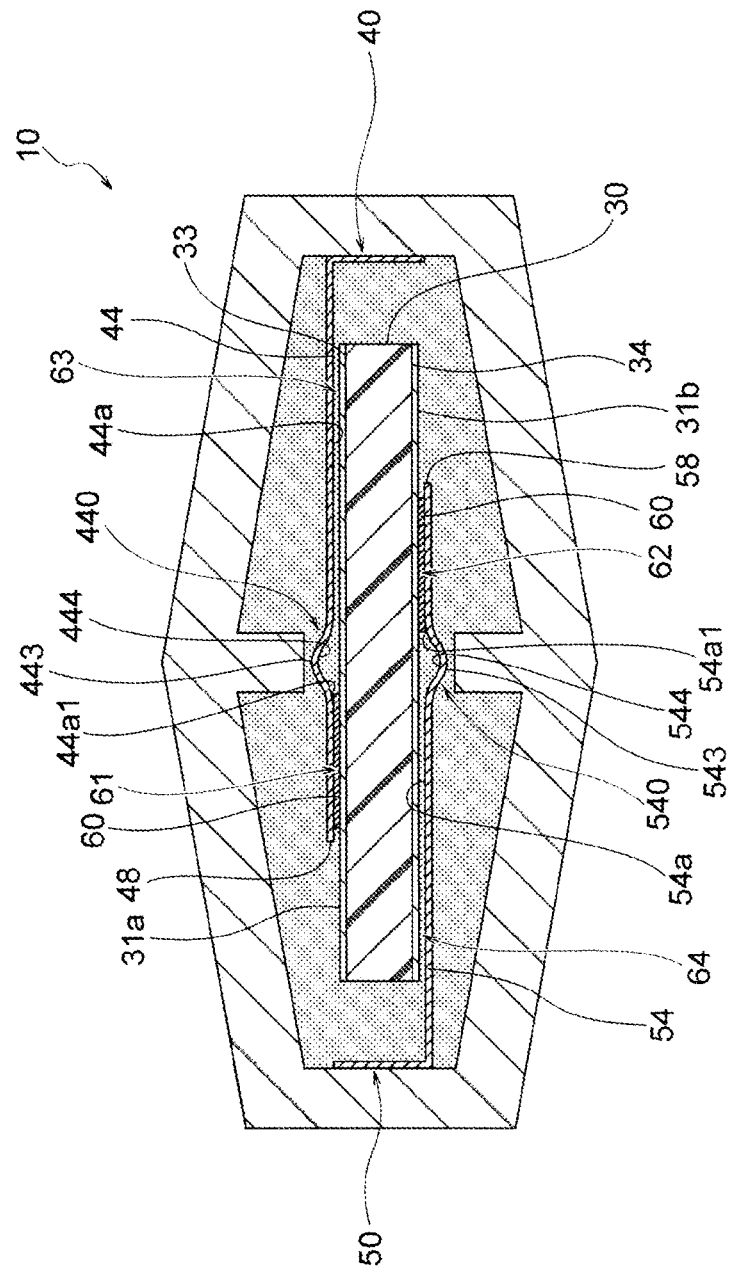
FIG. 11A is a cross-sectional view of the electronic device according to the second embodiment.

FIG. 9 is a schematic perspective view of the first metal terminal 40 and the second metal terminal 50 of the electronic device 10 according to the present embodiment. FIG. 10 is a plan view of the assembly of the ceramic element 30, the first metal terminal 40, and the second metal terminal 50 of the electronic device 10 according to the present embodiment. FIG. 11A is a cross-sectional view of the electronic device 10 according to the present embodiment.

As shown in FIG. 11A, in the present embodiment, the first solder stopper 440 is formed adjacent to the electrode proximity portion 44a1 on the facing surface 44a of the first electrode connection portion 44. In the present embodiment, the electrode proximity portion 44a1 corresponds to a portion with which the solder 60 is in contact. As shown in FIG. 9, in the present embodiment, the solder outflow prevention portion 443 is arranged so as to extend in a direction crossing the longitudinal direction of the first electrode connection portion 44.

As shown in FIG. 11A, in the present embodiment, the first solder stopper 440 includes the solder outflow prevention portion 443 for controlling the spread of the solder 60. The solder outflow prevention portion 443 includes a recessed portion 444 extending in a direction away from the first main surface 31a of the ceramic element 30. That is, the recessed portion 442 is recessed with respect to the ceramic element 30. As shown in FIG. 9, at an edge 444a of the recessed portion 444, an opening portion 444a1 that is not closed by the electrode proximity portion 44a1 is formed. At an edge 444b of the recessed portion 444, an opening portion 444b1 that is not closed by the electrode proximity portion 44a1 is formed.

As shown in FIG. 11A, in the present embodiment, the second solder stopper 540 is formed adjacent to the electrode proximity portion 54a1 on the facing surface 54a of the second electrode connection portion 54. In the present embodiment, the electrode proximity portion 54a1 corresponds to a portion with which the solder 60 is in contact. As shown in FIG. 9, in the present embodiment, a solder outflow prevention portion 543 is arranged so as to extend in a direction crossing the longitudinal direction of the second electrode connection portion 54.

As shown in FIG. 11A, in the present embodiment, the second solder stopper 540 includes the solder outflow prevention portion 543 for controlling the spread of the solder 60. The solder outflow prevention portion 543 includes a recessed portion 544 extending in a direction away from the second main surface 31b of the ceramic element 30. That is, the recessed portion 542 is recessed with respect to the ceramic element 30. As shown in FIG. 9, at an edge 544a of the recessed portion 544, an opening portion 544a1 that is not closed by the electrode proximity portion 54a1 is formed. At an edge 544b of the recessed portion 544, an opening portion 544b1 that is not closed by the electrode proximity portion 54a1 is formed.

As shown in FIG. 11A, in the present embodiment, the solder 60 adheres to the facing surfaces 44a and 54a between the solder outflow prevention portions 443 and 543 and ends 48 and 58. In addition, the solder 60 adheres to the first electrode portion 33 and the second electrode portion 34 to form the adhesion regions 61 and 62. The adhesion regions 61 and 62 and non-adhesion regions 63 and 64 to which the solder 60 does not adhere in the first electrode portion 33 or the second electrode portion 34 are separated from each other with the solder outflow prevention portions 443 and 543 as boundaries.

In the present embodiment, on the facing surface 44a of the first electrode connection portion 44 of the first metal terminal 40, molten solder is placed between the end 48 and the solder outflow prevention portion 443, and the first electrode connection portion 44 is pressed against the first main surface 31a of the ceramic element 30 so that the molten solder spreads. As a result, the first metal terminal 40 and the ceramic element 30 can be electrically connected to each other in the solder adhesion region 61.

In the recessed portion 444 of the solder outflow prevention portion 443, no pressing force acts on the molten solder spread between the first electrode portion 33 and the facing surface 44a. Therefore, the spread of the molten solder spread between the first electrode portion 33 and the facing surface 44a in the direction of the first terminal arm portion 46 is controlled. In this manner, the solder adhesion region 61 can be controlled to be located on the end 48 side of the first electrode connection portion 44.

Similarly to the first metal terminal 40, on the facing surface 54a of the second electrode connection portion 54 of the second metal terminal 50, molten solder is placed between the end 58 and the solder outflow prevention portion 543, and the second electrode connection portion 54 is pressed against the second main surface 31b of the ceramic element 30 so that the molten solder spreads. As a result, the second metal terminal 50 and the ceramic element 30 can be electrically connected to each other in the solder adhesion region 62.

In the recessed portion 544 of the solder outflow prevention portion 543, no pressing force acts on the molten solder spread between the second electrode portion 34 and the facing surface 54a. Therefore, the spread of the molten solder spread between the second electrode portion 34 and the facing surface 54a in the direction of the second terminal arm portion 56 is controlled. In this manner, the solder adhesion region 62 can be controlled to be located on the end 58 side of the second electrode connection portion 54.

Thus, in the present embodiment, the areas of the solder adhesion regions 61 and 62 are controlled to be small. For this reason, the ceramic element 30 is not excessively constrained by the first electrode connection portion 44 and the second electrode connection portion 54. Therefore, in the electronic device 10 according to the present embodiment, the pressure resistance can be improved.

Figure 11B:
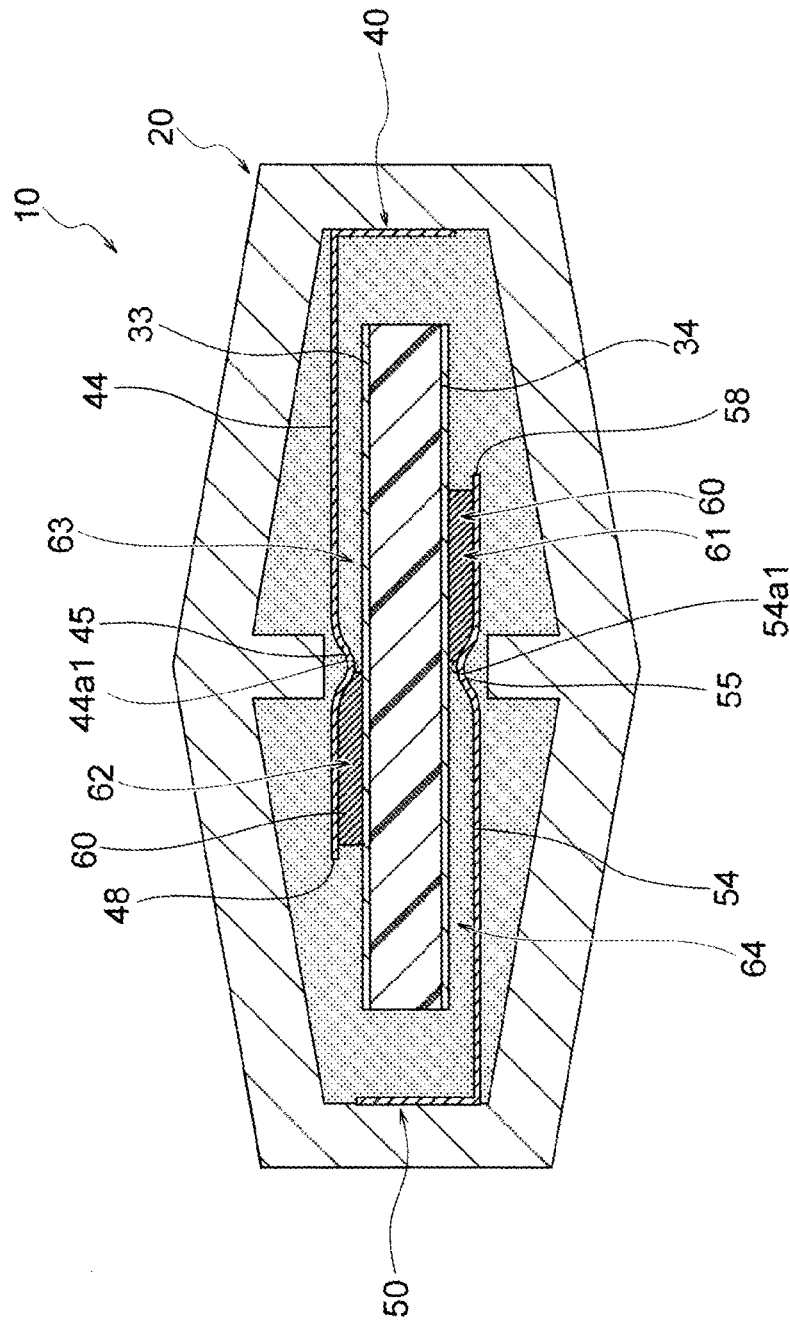
FIG. 11B is a cross-sectional view showing a modification example of the electronic device according to the second embodiment.

In the present embodiment, the first solder stopper 440 and the second solder stopper 540 include the recessed portions 444 and 544 extending in a direction away from the ceramic element 30, respectively, but the present disclosure is not limited thereto. For example, as shown in FIG. 11B, the first solder stopper 440 and the second solder stopper 540 may include protruding portions 45 and 55 that protrude in a direction approaching the ceramic element 30, respectively.

By adopting such a configuration, the spread of the solder 60 can be controlled by the distal end portions of the protruding portions 45 and 55 formed in the first electrode connection portion 44 and the second electrode connection portion 54 and the surfaces of the protruding portions 45 and 55 on the ends 48 and 58 side. In this case, the distal end portions of the protruding portions 45 and 55 become the electrode proximity portions 44a1 and 54a1, respectively, and are connected to the solder 60. Moreover, between the first electrode portion 33 and the facing surface 44a, the solder adhesion regions 61 and 62 are arranged closer to the ends 48 and 58 than the protruding portions 45 and 55. Therefore, the spread of the solder in the direction of the first terminal arm portion 46 and the second terminal arm portion 56 is controlled.

Third Embodiment

An electronic device according to the present embodiment is different from the electronic device 10 according to the first embodiment in terms of the first metal terminal and the second metal terminal 50, but the basic configuration is the same as that in the first embodiment. In the present embodiment, the description of portions in common with the first embodiment will be omitted, and different portions will mainly be described in detail below. Portions not described in the present embodiment are the same as those described in the first embodiment.

Figure 12:
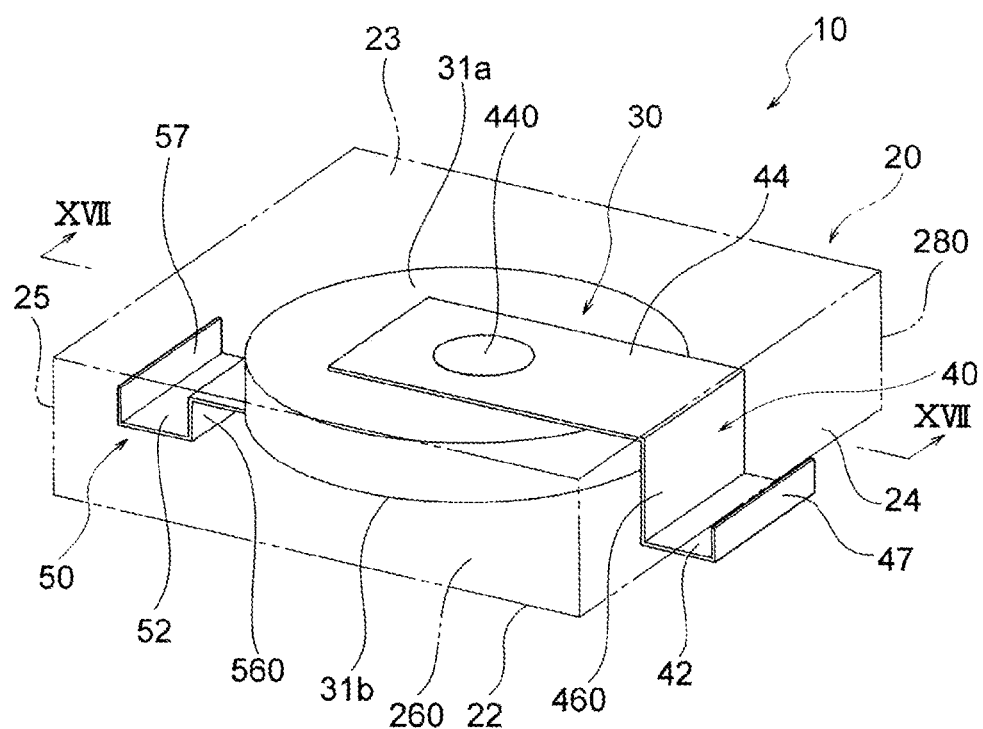
FIG. 12 is a schematic perspective view showing the configuration of an electronic device according to a third embodiment.
Figure 13:
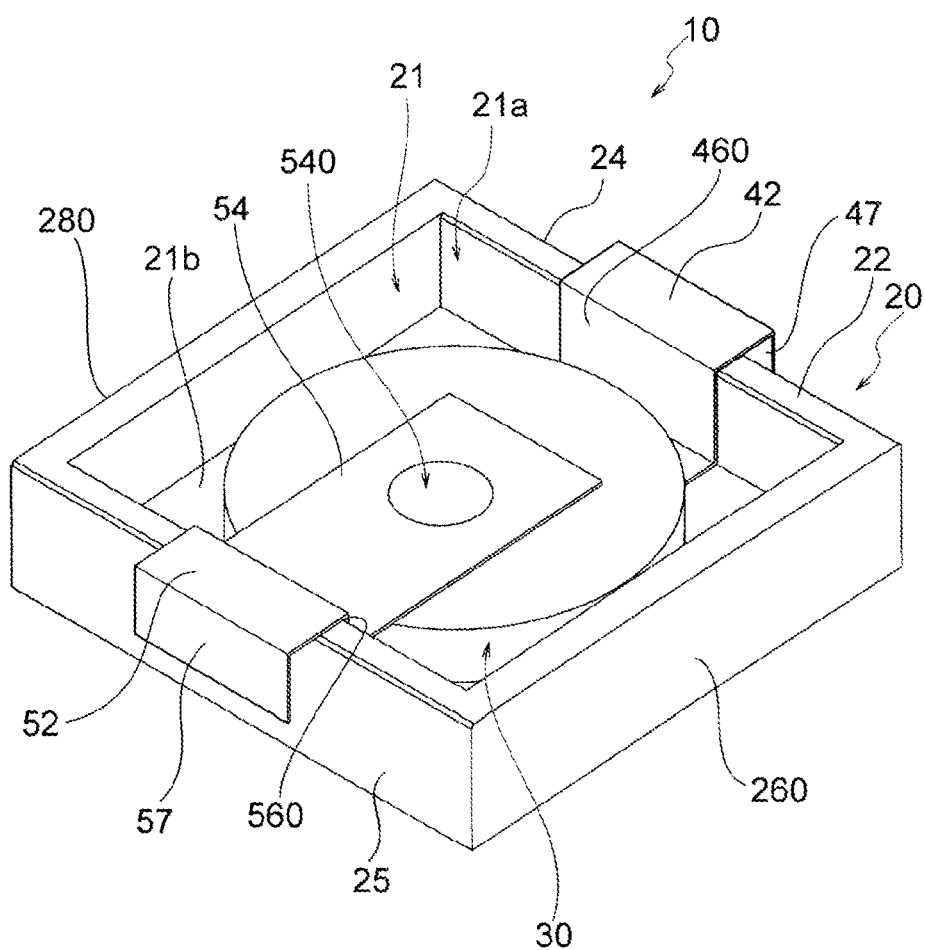
FIG. 13 is a schematic perspective view of the electronic device shown in FIG. 12 when viewed from another angle.

As shown in FIGS. 12 and 13, the external shape of the electronic device 10 according to the present embodiment is an approximately rectangular parallelepiped flat plate shape. The ceramic element 30 has the first main surface 31a and the second main surface 31b arranged approximately parallel to the top surface 23. As shown in FIG. 13, the case 20 of the present embodiment has four outer side surfaces perpendicular to the opening edge portion 22 surrounding the opening 21a of the housing recess 21. The four outer side surfaces of the case 20 are a first outer side surface 24, a second outer side surface 25, a third outer side surface 260, and a fourth outer side surface 280.

Figure 14:
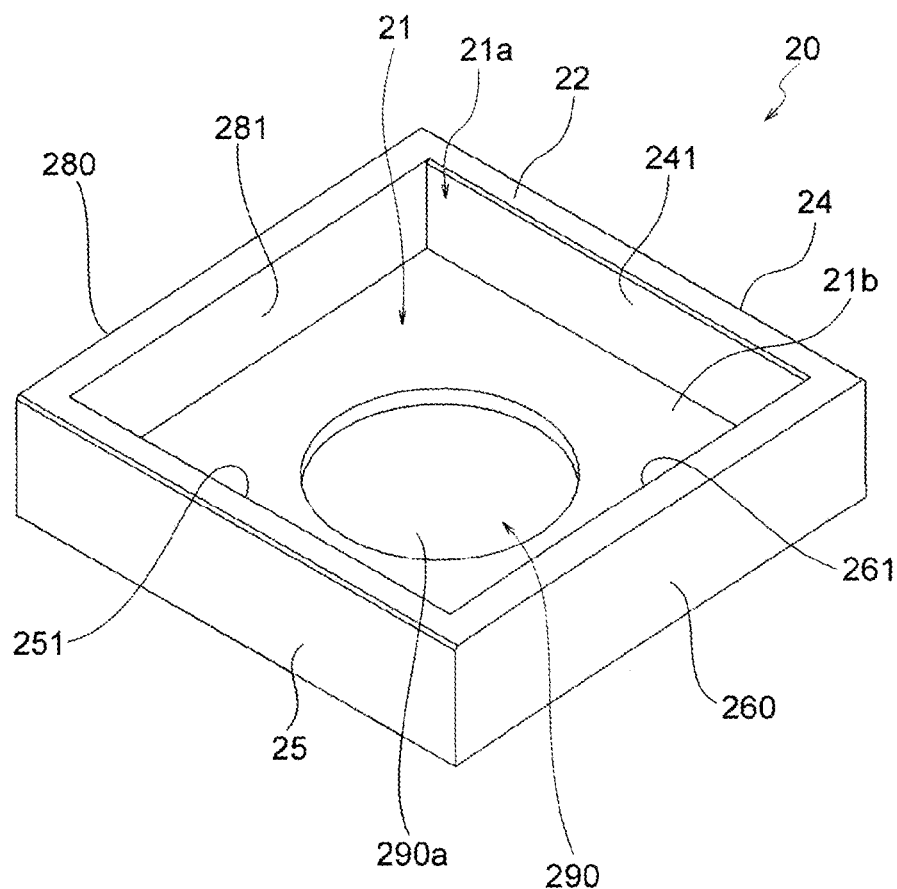
FIG. 14 is a schematic perspective view showing the configuration of a case of the electronic device shown in FIG. 12.

As shown in FIG. 14, the first outer side surface 24 and the second outer side surface 25 are a pair of outer side surfaces facing each other. In addition, the third outer side surface 260 and the fourth outer side surface 280 are a pair of outer side surfaces facing each other. The first outer side surface 24 and the second outer side surface 25 are perpendicularly connected to the third outer side surface 260 and the fourth outer side surface 280.

As shown in FIG. 12, the first outer side surface 24, the second outer side surface 25, the third outer side surface 260, and the fourth outer side surface 280 are arranged approximately perpendicular to the first main surface 31a and the second main surface 31b.

As shown in FIG. 14, the housing recess 21 has four inner side surfaces along the outer shape of the case 20. The first inner side surface 241 is parallel to the first outer side surface 24, the second inner side surface 251 is parallel to the second outer side surface 25, the third inner side surface 261 is parallel to the third outer side surface 260, and the fourth inner side surface 281 is parallel to the fourth outer side surface 280.

Figure 17:
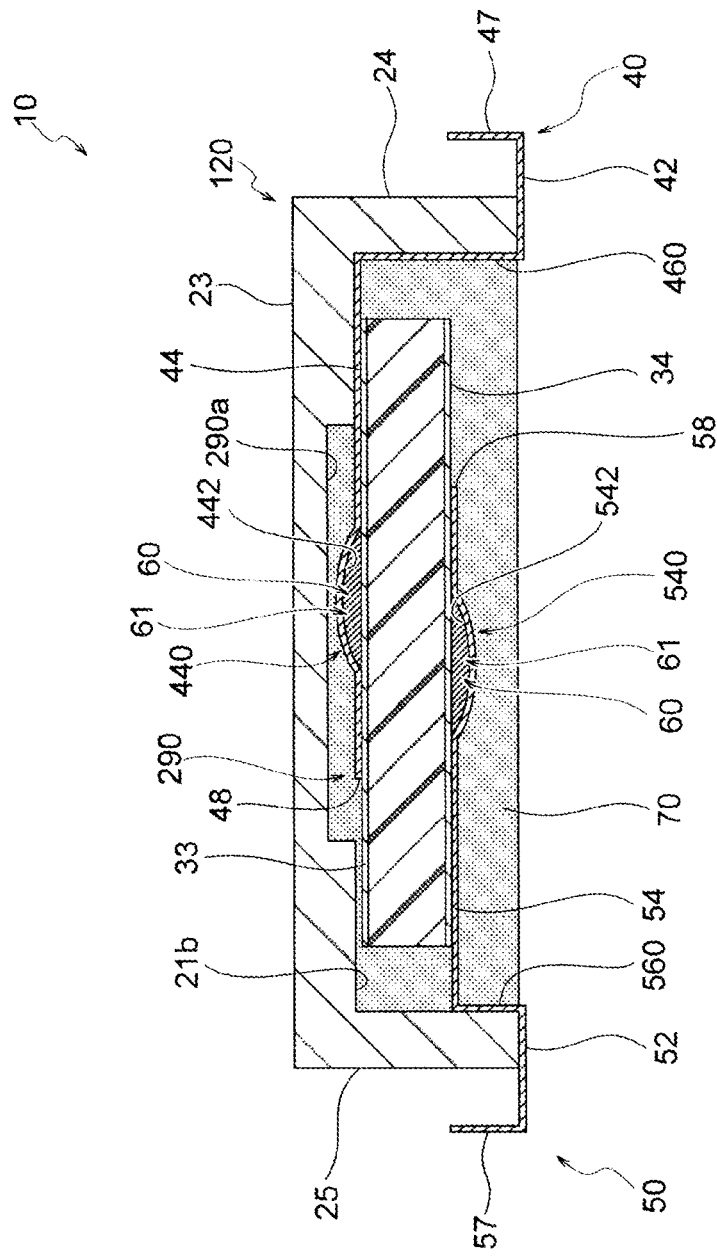
FIG. 17 is a cross-sectional view taken along the line XVII-XVII shown in FIG. 12.

As shown in FIG. 14, a solder stopper arrangement hole 290 is formed on the bottom surface 21b of the housing recess 21. As shown in FIG. 17, a bottom portion 290a of the solder stopper arrangement hole 290 is deeper than the bottom surface 21b. Therefore, the first solder stopper 440 is not in contact with the case 20 when the first solder stopper 440 is arranged in the solder stopper arrangement hole 290.

As shown in FIG. 13, the ceramic element 30 is arranged in the housing recess 21 so that the second main surface 31b faces the same direction as the opening 21a, without a part of the ceramic element 30 being exposed.

Figure 15:
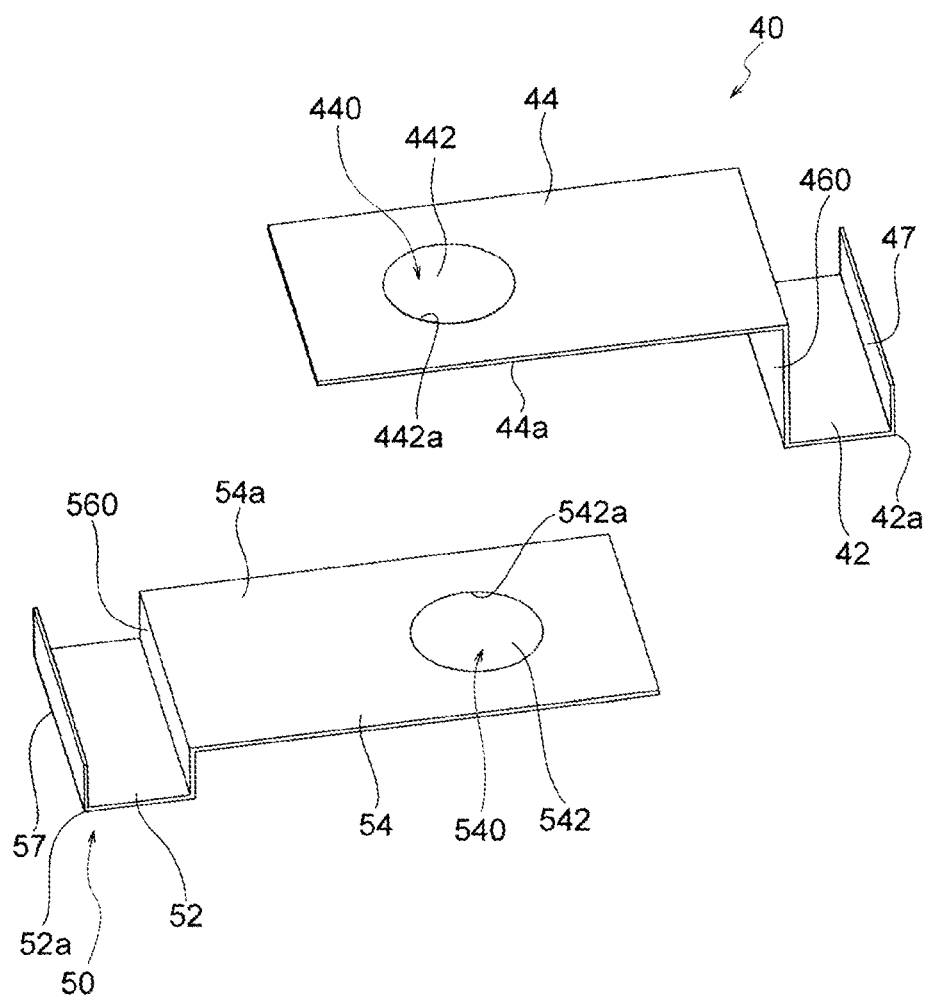
FIG. 15 is a schematic perspective view showing the configuration of a metal terminal of the electronic device shown in FIG. 12.
Figure 16:
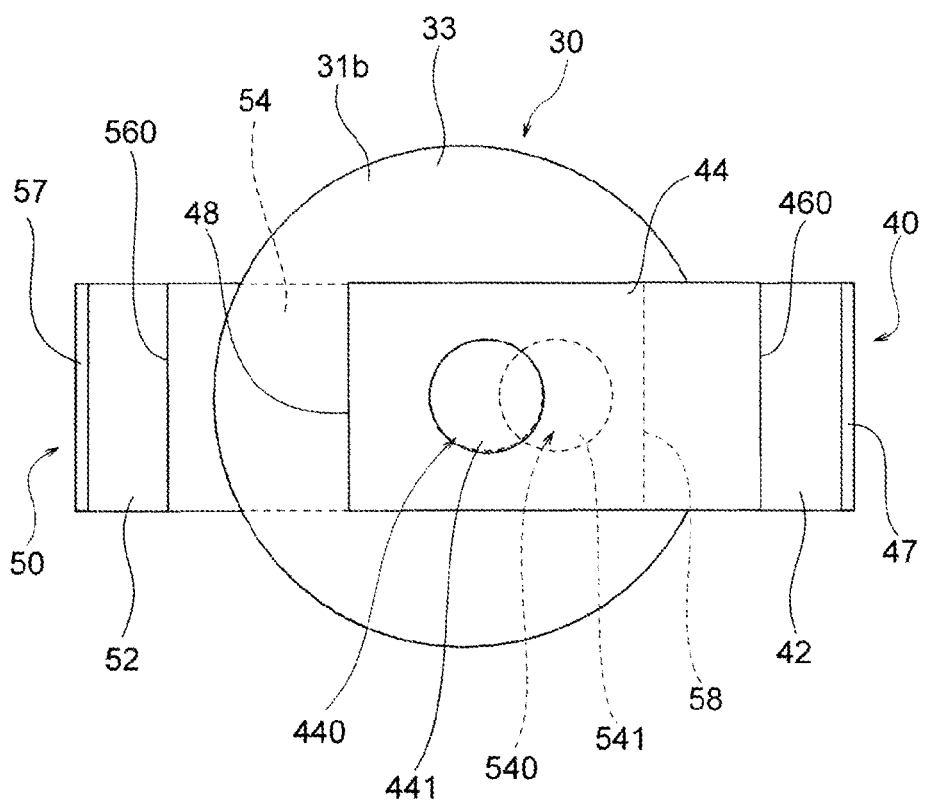
FIG. 16 is a plan view showing a partially assembled state of the electronic device according to the third embodiment.

FIG. 15 is a schematic perspective view showing the first metal terminal 40 and the second metal terminal 50 in the present embodiment. FIG. 16 is a plan view of the assembly of the ceramic element 30, the first metal terminal 40, and the second metal terminal 50 of the electronic device 10 according to the present embodiment. FIG. 17 is a cross-sectional view of the electronic device 10 according to the present embodiment.

As shown in FIG. 17, in the first metal terminal 40, the facing surface 44a of the first electrode connection portion 44 is connected to the first electrode portion 33 formed on the first main surface 31a through solder. On the other hand, the first external connection portion 42 is arranged on the first outer side surface 24 side of the opening edge portion 22. In addition, the first external connection portion 42 is approximately parallel to the first main surface 31a and the second main surface 31b of the ceramic element 30.

As shown in FIG. 17, in the present embodiment, the first terminal arm portion 460 of the first metal terminal 40 has one end connected to the first electrode connection portion 44 and the other end extending to the second main surface 31b side of the ceramic element 30. The other end of the first terminal arm portion 460 is connected to the first external connection portion 42.

As shown in FIG. 15, the distal end 42a of the first external connection portion 42 is an end on a side opposite to a side of the first external connection portion 42 connected to the first terminal arm portion 46, and is connected to the first folded portion 47.

As shown in FIG. 17, in the second metal terminal 50, the facing surface 54a of the second electrode connection portion 54 is connected to the second electrode portion 34 formed on the second main surface 31b through solder. On the other hand, the second external connection portion 52 is arranged on the first outer side surface 25 side of the opening edge portion 22. In addition, the second external connection portion 52 is approximately parallel to the first main surface 31a and the second main surface 31b of the ceramic element 30.

As shown in FIG. 17, in the present embodiment, the second terminal arm portion 560 of the second metal terminal 50 has one end connected to the second electrode connection portion 54 and the other end extending to the second main surface 31b side of the ceramic element 30. The other end of the second terminal arm portion 560 is connected to the second external connection portion 52.

As shown in FIG. 15, the distal end 52a of the second external connection portion 52 is an end on a side opposite to a side of the second external connection portion 52 connected to the second terminal arm portion 56, and is connected to the second folded portion 57.

As shown in FIG. 13, in the electronic device 10 according to the present embodiment, the first external connection portion 42 and the second external connection portion 52 are arranged in the opening edge portion 22 of the case 20, and the opening 21a side of the housing recess 21 is a mounting surface side facing a substrate that is a mounting target. In addition, in the present embodiment, the second main surface 31b of the ceramic element 30 faces the same direction as the opening 21a of the housing recess 21, so that the height of the electronic device 10 is reduced. In addition, since the area of the electronic device 10 on the mounting surface side is large, the electronic device 10 is more stable when mounted.

In the present embodiment, the first solder stopper 440 and the second solder stopper 540 have the same configuration as the first solder stopper 440 and the second solder stopper 540 according to the first embodiment, and accordingly, have the same effect.

That is, as shown in FIG. 17, the first solder stopper 440 includes the solder storage portion 441 in which the solder 60 can be stored. The solder storage portion 441 includes the recessed portion 442 extending in a direction away from the ceramic element 30 due to the undulation of the facing surface 44a in the electrode proximity portion 44a1.

In addition, the second solder stopper 540 includes the solder storage portion 541 in which the solder 60 can be stored. The solder storage portion 541 includes the recessed portion 542 extending in a direction away from the ceramic element 30 due to the undulation of the facing surface 54a in the electrode proximity portion 54a1.

With such a configuration, in the present embodiment, the areas of the solder adhesion regions 61 and 62 are controlled to be small. Therefore, the pressure resistance can be improved.

Fourth Embodiment

An electronic device according to the present embodiment is different from the electronic device 10 according to the third embodiment in terms of the first solder stopper 440 and the second solder stopper 540, but the basic configuration is the same as that in the third embodiment. In the present embodiment, the description of portions in common with the third embodiment will be omitted, and different portions will mainly be described in detail below. Portions not described in the present embodiment are the same as those described in the third embodiment.

Figure 18:
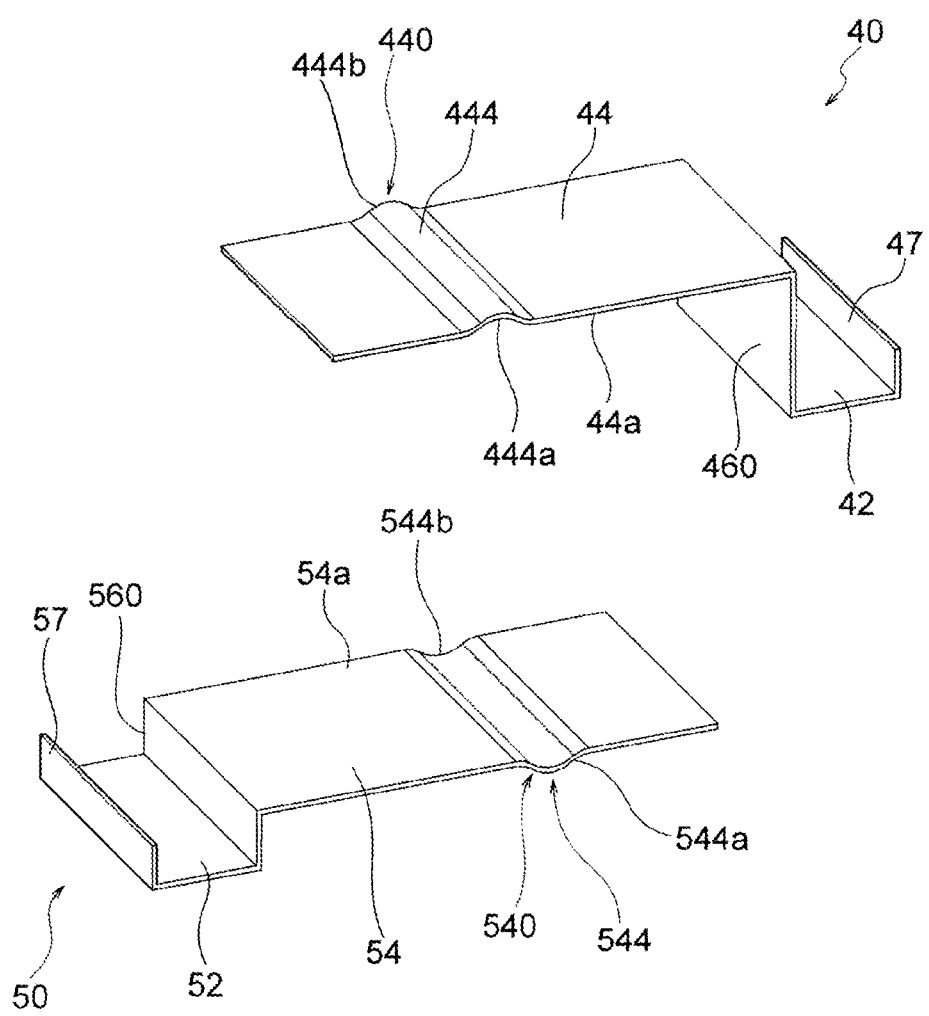
FIG. 18 is a schematic perspective view showing the configuration of a metal terminal of an electronic device according to a fourth embodiment.
Figure 19:
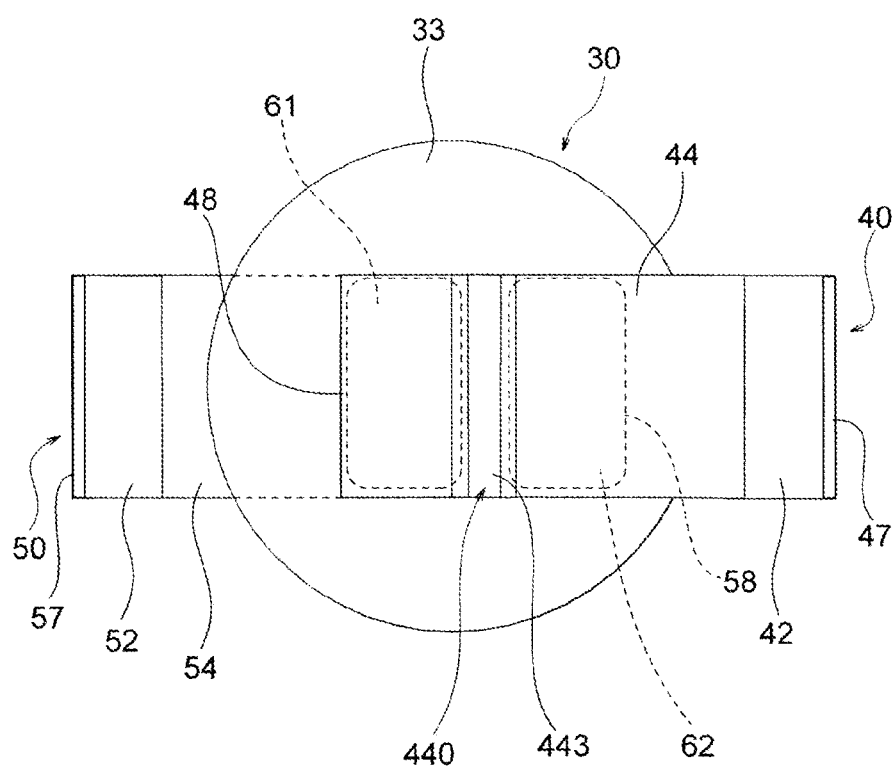
FIG. 19 is a plan view showing a partially assembled state of the electronic device according to the fourth embodiment.
Figure 20:
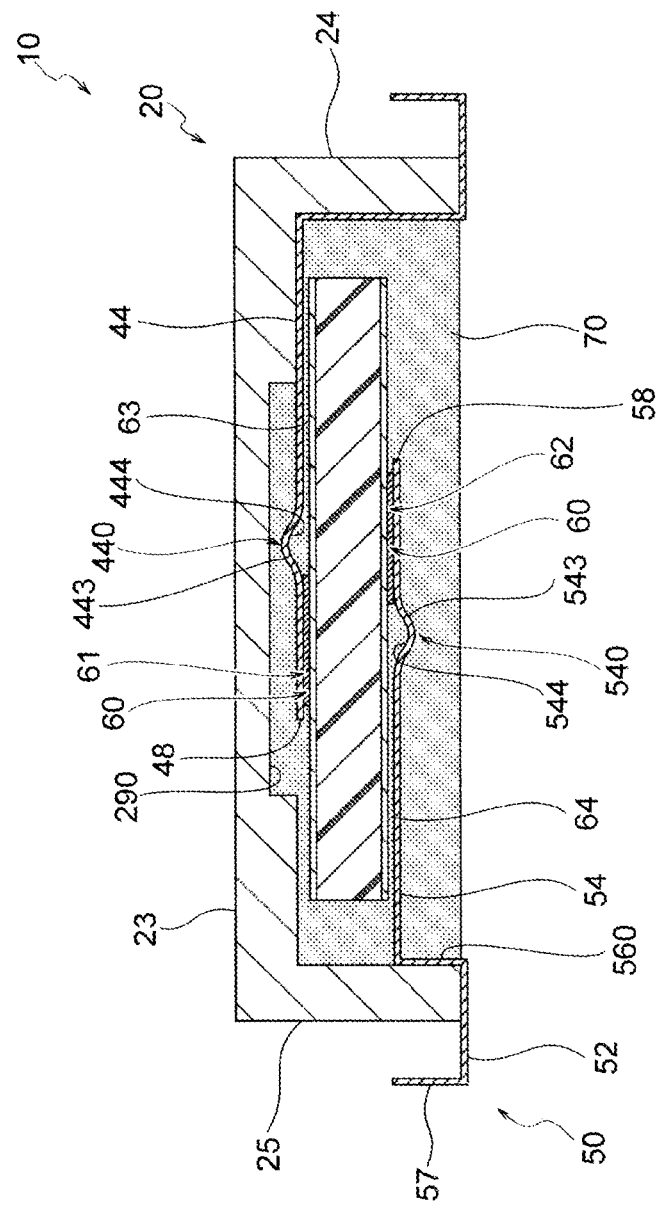
FIG. 20 is a cross-sectional view of the electronic device according to the fourth embodiment.

FIG. 18 is a schematic perspective view of the first metal terminal 40 and the second metal terminal 50 according to the present embodiment. FIG. 19 is a plan view of the assembly of the ceramic element 30, the first metal terminal 40, and the second metal terminal 50 of the electronic device 10 according to the present embodiment. FIG. 20 is a cross-sectional view of the electronic device 10 according to the present embodiment.

In the present embodiment, the first solder stopper 440 and the second solder stopper 540 have the same configuration as the first solder stopper 440 and the second solder stopper 540 according to the second embodiment, and accordingly, have the same effect.

That is, as shown in FIG. 20, the first solder stopper 440 includes the solder outflow prevention portion 443 for controlling the spread of the solder 60. The solder outflow prevention portion 443 includes the recessed portion 444 extending in a direction away from the first main surface 31a of the ceramic element 30. The solder outflow prevention portion 443 is arranged so as to extend in a direction crossing the longitudinal direction of the first electrode connection portion 44.

In addition, the second solder stopper 540 includes the solder outflow prevention portion 543 for controlling the spread of the solder 60. The solder outflow prevention portion 543 includes the recessed portion 544 extending in a direction away from the first main surface 31a of the ceramic element 30. The solder outflow prevention portion 543 is arranged so as to extend in a direction crossing the longitudinal direction of the second electrode connection portion 54. With such a configuration, in the present embodiment, the areas of the solder adhesion regions 61 and 62 are controlled to be small. Therefore, the pressure resistance can be improved.

In addition, the above-described embodiments include, within the scope of the technical scope, forms with various design changes that do not depart from the gist of the claims.

For example, a solder storage portion or a solder outflow prevention portion that forms a solder stopper may be formed so that the facing surface of an electrode connection portion is undulated so as to prevent the solder adhesion region from spreading excessively, or a plurality of solder storage portions or solder outflow prevention portions may be provided in one electrode connection portion.

EXPLANATIONS OF LETTERS OR NUMERALS

10 ELECTRONIC DEVICE
20 CASE
21 HOUSING RECESS
21a OPENING
21b BOTTOM SURFACE
22 OPENING EDGE PORTION
23 TOP SURFACE
24 FIRST OUTER SIDE SURFACE
25 SECOND OUTER SIDE SURFACE
26a FIFTH OUTER SIDE SURFACE
26b, 260 THIRD OUTER SIDE SURFACE
28a, 280 FOURTH OUTER SIDE SURFACE
28b SIXTH OUTER SIDE SURFACE
241 FIRST INNER SIDE SURFACE
251 SECOND INNER SIDE SURFACE
26a1 FIFTH INNER SIDE SURFACE
26b1, 261 THIRD INNER SIDE SURFACE
28a1, 281 FOURTH INNER SIDE SURFACE
28b1 SIXTH INNER SIDE SURFACE
291, 292 SUPPORT PORTION
290 SOLDER STOPPER ARRANGEMENT HOLE
290a BOTTOM PORTION
30 CERAMIC ELEMENT
31a FIRST MAIN SURFACE
33 FIRST ELECTRODE PORTION
31b SECOND MAIN SURFACE
34 SECOND ELECTRODE PORTION
35 DIELECTRIC PORTION
40 FIRST METAL TERMINAL
42 FIRST EXTERNAL CONNECTION PORTION
42a DISTAL END
44 FIRST ELECTRODE CONNECTION PORTION
44a FACING SURFACE
44a1 ELECTRODE PROXIMITY PORTION
440 FIRST SOLDER STOPPER
441 SOLDER STORAGE PORTION
442 RECESSED PORTION
442a EDGE
443 SOLDER OUTFLOW PREVENTION PORTION
444 RECESSED PORTION
444a, 444b EDGE
444a1, 445b1 OPENING PORTION
45 PROTRUDING PORTION
48 END
47 FIRST FOLDED PORTION 46, 460 FIRST TERMINAL ARM PORTION
50 SECOND METAL TERMINAL
52 SECOND EXTERNAL CONNECTION PORTION
52a DISTAL END
54 SECOND ELECTRODE CONNECTION PORTION
54a FACING SURFACE
54a1 ELECTRODE PROXIMITY PORTION
540 SECOND SOLDER STOPPER
541 SOLDER STORAGE PORTION
542 RECESSED PORTION
542a EDGE
543 SOLDER OUTFLOW PREVENTION PORTION
544 RECESSED PORTION
544a, 544b EDGE
544a1, 545b1 OPENING PORTION
55 PROTRUDING PORTION
58 END
57 SECOND FOLDED PORTION
56, 560 SECOND TERMINAL ARM PORTION
60 SOLDER
61, 62 ADHESION REGION
63, 64 NON-ADHESION REGION
70 MOLD RESIN

What is claimed is:

1. An electronic device, comprising:
a ceramic element including a first electrode portion and a second electrode portion;
a first metal terminal including a first electrode connection portion and a first external connection portion, the first electrode connection portion being connected to the first electrode portion through solder; and
a second metal terminal including a second electrode connection portion and a second external connection portion, the second electrode connection portion being connected to the second electrode portion through solder, wherein
the first electrode connection portion includes a first solder stopper formed by undulation of at least a part of a facing surface of the first electrode connection portion facing the first electrode portion to control a range of an adhesion region of solder to the first electrode portion,
the second electrode connection portion includes a second solder stopper formed by undulation of at least a part of a facing surface of the second electrode connection portion facing the second electrode portion to control a range of an adhesion region of solder to the second electrode portion,
at least one of the first solder stopper and the second solder stopper includes an electrode proximity portion on the facing surface and a solder storage portion for storing solder,
the solder storage portion includes a recessed portion extending in a direction away from the ceramic element, and an edge of the recessed portion is closed by the electrode proximity portion.

2. The electronic device according to claim 1, wherein at least one of the first solder stopper and the second solder stopper includes a solder outflow prevention portion for controlling spread of solder, which is formed adjacent to an electrode proximity portion on the facing surface.

3. The electronic device according to claim 2, wherein the solder outflow prevention portion includes a recessed portion extending in a direction away from the ceramic element.

4. The electronic device according to claim 2, wherein the solder outflow prevention portion includes a recessed portion extending in a direction away from the ceramic element, and a part of an edge of the recessed portion has an opening portion that is not closed by the electrode proximity portion.

5. The electronic device according to claim 1, further comprising a case in which the ceramic element is housed in a housing recess.

6. The electronic device according to claim 5, wherein the first external connection portion and the second external connection portion are arranged on an opening edge portion of the housing recess.

7. The electronic device according to claim 6, wherein the first external connection portion and the second external connection portion are arranged approximately parallel to a first main surface and a second main surface of the ceramic element.

8. The electronic device according to claim 6, wherein the first external connection portion and the second external connection portion are arranged approximately perpendicular to a first main surface and a second main surface of the ceramic element.

9. An electronic device, comprising:
a ceramic element including a first electrode portion and a second electrode portion;
a first metal terminal including a first electrode connection portion and a first external connection portion, the first electrode connection portion being connected to the first electrode portion through solder; and
a second metal terminal including a second electrode connection portion and a second external connection portion, the second electrode connection portion being connected to the second electrode portion through solder, wherein
the first electrode connection portion includes a first solder stopper formed by undulation of at least a part of a facing surface of the first electrode connection portion facing the first electrode portion to control a range of an adhesion region of solder to the first electrode portion,
the second electrode connection portion includes a second solder stopper formed by undulation of at least a part of a facing surface of the second electrode connection portion facing the second electrode portion to control a range of an adhesion region of solder to the second electrode portion,
at least one of the first solder stopper and the second solder stopper includes a solder outflow prevention portion for controlling spread of solder, which is formed adjacent to an electrode proximity portion on the facing surface,
the first electrode connection portion has an approximately rectangular shape extending along a first main surface of the ceramic element,
the second electrode connection portion has an approximately rectangular shape extending along a second main surface of the ceramic element, and at least one of the first electrode connection portion and the second electrode connection portion has the solder outflow prevention portion arranged so as to extend in a direction crossing a longitudinal direction of the first electrode connection portion or the second electrode connection portion.

10. The electronic device according to claim 9, wherein the adhesion region and a non-adhesion region of the first electrode portion or the second electrode portion to which solder does not adhere are separated from each other with the solder outflow prevention portion as a boundary.

11. The electronic device according to claim 9, wherein at least one of the first solder stopper and the second solder stopper includes a protruding portion that protrudes in a direction approaching the ceramic element.

12. The electronic device according to claim 9, wherein at least one of the first solder stopper and the second solder stopper includes an electrode proximity portion on the facing surface and a solder storage portion for storing solder.

13. The electronic device according to claim 12, wherein the solder storage portion includes a recessed portion extending in a direction away from the ceramic element.

14. An electronic device, comprising:
   a ceramic element including a first electrode portion and a second electrode portion;
   a case in which the ceramic element is housed in a housing recess;
   a first metal terminal including a first electrode connection portion and a first external connection portion, the first electrode connection portion being connected to the first electrode portion through solder; and
   a second metal terminal including a second electrode connection portion and a second external connection portion, the second electrode connection portion being connected to the second electrode portion through solder, wherein
   the first electrode connection portion includes a first solder stopper formed by undulation of at least a part of a facing surface of the first electrode connection portion facing the first electrode portion to control a range of an adhesion region of solder to the first electrode portion,
   the second electrode connection portion includes a second solder stopper formed by undulation of at least a part of a facing surface of the second electrode connection portion facing the second electrode portion to control a range of an adhesion region of solder to the second electrode portion, and
   the housing recess is filled with mold resin.

* * * * *